US010833832B2

(12) United States Patent
Yeh et al.

(10) Patent No.: US 10,833,832 B2
(45) Date of Patent: Nov. 10, 2020

(54) COMMUNICATION DEVICE AND A METHOD FOR FULL DUPLEX SCHEDULING

(71) Applicant: Intel Corporation, Santa Clara, CA (US)

(72) Inventors: Shu-Ping Yeh, Campbell, CA (US); Jingwen Bai, San Jose, CA (US); Sung-En Chiu, La Jolla, CA (US); Ping Wang, San Jose, CA (US); Feng Xue, Redwood City, CA (US); Yang-Seok Choi, Portland, OR (US); Shilpa Talwar, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/303,182

(22) PCT Filed: Jun. 22, 2016

(86) PCT No.: PCT/US2016/038594
§ 371 (c)(1),
(2) Date: Nov. 20, 2018

(87) PCT Pub. No.: WO2017/222511
PCT Pub. Date: Dec. 28, 2017

(65) Prior Publication Data
US 2020/0119890 A1 Apr. 16, 2020

(51) Int. Cl.
H04W 4/00 (2018.01)
H04L 5/00 (2006.01)
(Continued)

(52) U.S. Cl.
CPC .......... H04L 5/0075 (2013.01); H04L 5/0007 (2013.01); H04L 5/0037 (2013.01);
(Continued)

(58) Field of Classification Search
None
See application file for complete search history.

(56) References Cited

U.S. PATENT DOCUMENTS 4,103,303 A  7/1978  Regenos et al.
5,767,363 A  6/1998  De Silva et al.
(Continued)

FOREIGN PATENT DOCUMENTS

AT       309652 T       11/2005
AU    2003242944 A1     2/2004
(Continued)

OTHER PUBLICATIONS

Motorola Mobility, "Scenario and Modeling Discussion for DL-MIMO Enhancement", R1-112444, Aug. 2011, 4 pages, Agenda Item 6.6.2, 3GPP TSG RAN1 #66, Athens, Greece.
(Continued)

Primary Examiner — Elisabeth Benoit Magloire
(74) Attorney, Agent, or Firm — Viering, Jentschura & Partner MBB

(57) ABSTRACT

A communication device and a method for determining an information from a second device including setting an initial beamforming pattern is provided. The initial beamforming pattern includes a beamforming direction and a corresponding beamforming area for each of the plurality of antenna ports, including determining a concerned direction interval based on overlapping beamforming areas of adjacent pairs of the plurality of antenna ports, receiving a signal from the second device, measuring a signal gain from the signal on each of the plurality of antenna ports, determining which concerned direction interval the second device occupies based on an antenna port having the highest signal gain and on one of the adjacent pair of antenna ports to the antenna port having the highest signal gain having a higher signal
(Continued)

gain, and determining the information from the second device based on the determined concerned direction interval.

20 Claims, 7 Drawing Sheets

(51) Int. Cl.
*H04L 5/14* (2006.01)
*H04W 72/12* (2009.01)
*H04W 88/08* (2009.01)

(52) U.S. Cl.
CPC ............ *H04L 5/14* (2013.01); *H04W 72/121* (2013.01); *H04W 72/1257* (2013.01); *H04W 88/08* (2013.01)

(56) References Cited

U.S. PATENT DOCUMENTS

| | | |
|---|---|---|
| 6,614,985 B1 | 9/2003 | Tokunaka et al. |
| 6,631,122 B1 | 10/2003 | Arunachalam et al. |
| 6,717,927 B2 | 4/2004 | Chao et al. |
| 6,792,269 B2 | 9/2004 | Boehmke |
| 6,906,998 B1 | 6/2005 | Mujeeb et al. |
| 7,254,608 B2 | 8/2007 | Yeager et al. |
| 7,318,108 B2 | 1/2008 | Sreekantiah et al. |
| 7,359,734 B2 | 4/2008 | Ylitalo |
| 7,366,477 B2 | 4/2008 | Sebire et al. |
| 7,408,900 B2 | 8/2008 | Hunkeler |
| 7,458,080 B2 | 11/2008 | Parker et al. |
| 7,471,961 B2 | 12/2008 | Fabien et al. |
| 7,554,941 B2 | 6/2009 | Ratiu et al. |
| 7,579,995 B1 | 8/2009 | Theunissen et al. |
| 7,599,365 B1 | 10/2009 | Sabol et al. |
| 7,613,120 B2 | 11/2009 | Devereux et al. |
| 7,627,325 B2 | 12/2009 | McCoy |
| 7,630,370 B2 | 12/2009 | Deshpande et al. |
| 7,630,688 B2 | 12/2009 | Zeira |
| 7,664,119 B2 | 2/2010 | Adams et al. |
| 7,668,080 B2 | 2/2010 | Murugan |
| 7,729,464 B2 | 6/2010 | Taich et al. |
| 7,756,548 B2 | 7/2010 | Laroia et al. |
| 7,774,000 B2 | 8/2010 | Kezys |
| 7,835,743 B2 | 11/2010 | Zhang et al. |
| 7,912,491 B2 | 3/2011 | Mohanty et al. |
| 8,005,716 B1 | 8/2011 | Desikan |
| 8,077,683 B2 | 12/2011 | Rudolf et al. |
| 8,107,883 B2 | 1/2012 | Peng et al. |
| 8,122,283 B2 | 2/2012 | Olson et al. |
| 8,174,994 B2 | 5/2012 | Forssell et al. |
| 8,185,120 B2 | 5/2012 | Hassan et al. |
| 8,195,835 B2 | 6/2012 | Ansari et al. |
| 8,224,367 B2 | 7/2012 | Wang |
| 8,228,929 B2 | 7/2012 | Aybay et al. |
| 8,260,348 B2 | 9/2012 | Sherman |
| 8,270,908 B2 | 9/2012 | Wang et al. |
| 8,289,917 B1 | 10/2012 | Koivisto et al. |
| 8,305,921 B2 | 11/2012 | Narasimhan et al. |
| 8,325,860 B2 | 12/2012 | Gomadam et al. |
| 8,335,466 B2 | 12/2012 | Cai et al. |
| 8,391,141 B2 | 3/2013 | Rune et al. |
| 8,447,368 B2 | 5/2013 | Zettler et al. |
| 8,488,549 B2 | 7/2013 | Yang et al. |
| 8,493,887 B2 | 7/2013 | Palanki et al. |
| 8,504,052 B2 | 8/2013 | Hakola et al. |
| 8,509,105 B2 | 8/2013 | Kneckt et al. |
| 8,509,338 B2 | 8/2013 | Sayana et al. |
| 8,542,620 B2 | 9/2013 | Sampathkumar |
| 8,548,483 B2 | 10/2013 | Phan et al. |
| 8,559,610 B2 | 10/2013 | Crockett et al. |
| 8,565,744 B2 | 10/2013 | Taaghol et al. |
| 8,577,363 B2 | 11/2013 | Wijting et al. |
| 8,582,593 B2 | 11/2013 | Chen et al. |
| 8,593,952 B2 | 11/2013 | Puthenpura et al. |
| 8,612,567 B2 | 12/2013 | Lee |
| 8,634,333 B2 | 1/2014 | Sarkar |
| 8,639,772 B2 | 1/2014 | Gentile et al. |
| 8,675,587 B2 | 3/2014 | Puthenpura et al. |
| 8,675,762 B2 | 3/2014 | Cheng et al. |
| 8,687,514 B2 | 4/2014 | Yamamoto et al. |
| 8,717,229 B2 | 5/2014 | Blachford |
| 8,743,696 B2 | 6/2014 | Chowdhury |
| 8,744,458 B2 | 6/2014 | Hakola et al. |
| 8,749,441 B2 | 6/2014 | Fenn et al. |
| 8,750,110 B2 | 6/2014 | Baliga et al. |
| 8,750,218 B2 | 6/2014 | McBeath et al. |
| 8,767,581 B2 | 7/2014 | Yamada |
| 8,780,711 B2 | 7/2014 | Baliga et al. |
| 8,797,875 B2 | 8/2014 | Garcia Martin et al. |
| 8,805,300 B2 | 8/2014 | Alrabadi et al. |
| 8,811,258 B2 | 8/2014 | Etemad et al. |
| 8,824,315 B2 | 9/2014 | Kokkinen et al. |
| 8,824,433 B2 | 9/2014 | Chen et al. |
| 8,830,883 B2 | 9/2014 | Chen et al. |
| 8,839,044 B2 | 9/2014 | Alanis et al. |
| 8,848,700 B2 | 9/2014 | Ahn et al. |
| 8,849,344 B2 | 9/2014 | Hirano |
| 8,867,458 B2 | 10/2014 | Koskela et al. |
| 8,867,495 B2 | 10/2014 | Farajidana et al. |
| 8,873,454 B2 | 10/2014 | Chen et al. |
| 8,879,433 B2 | 11/2014 | Khojastepour et al. |
| 8,884,888 B2 | 11/2014 | Chin |
| 8,885,479 B2 | 11/2014 | Damnjanovic et al. |
| 8,891,647 B2 | 11/2014 | Ma |
| 8,903,454 B2 | 12/2014 | Lee et al. |
| 8,913,573 B2 | 12/2014 | Chen et al. |
| 8,913,682 B2 | 12/2014 | Nam et al. |
| 8,929,230 B2 | 1/2015 | Wang et al. |
| 8,942,173 B2 | 1/2015 | Li et al. |
| 8,976,657 B2 | 3/2015 | Fang |
| 8,982,743 B2 | 3/2015 | Luo et al. |
| 8,996,649 B2 | 3/2015 | Giaretta et al. |
| 8,995,261 B2 | 6/2015 | Park et al. |
| 9,065,519 B2 | 6/2015 | Cyzs et al. |
| 9,094,790 B2 | 7/2015 | Foti et al. |
| 9,094,841 B2 | 7/2015 | Sayana et al. |
| 9,094,960 B2 | 7/2015 | He et al. |
| 9,113,453 B2 | 8/2015 | Moberg et al. |
| 9,160,497 B2 | 10/2015 | Elliott |
| 9,185,564 B2 | 11/2015 | Yin et al. |
| 9,190,715 B2 | 11/2015 | Barker et al. |
| 9,210,645 B2 | 12/2015 | Gleixner et al. |
| 9,246,620 B2 | 1/2016 | Yang et al. |
| 9,307,550 B2 | 4/2016 | Zou et al. |
| 9,343,808 B2 | 5/2016 | Harel et al. |
| 9,351,143 B2 | 5/2016 | Barany et al. |
| 9,357,537 B2 | 5/2016 | Hwang et al. |
| 9,374,704 B2 | 6/2016 | Chen et al. |
| 9,397,738 B2 | 7/2016 | Xu et al. |
| 9,419,880 B2 | 8/2016 | Kips et al. |
| 9,432,977 B2 | 8/2016 | Kim et al. |
| 9,451,570 B2 | 9/2016 | Cheng et al. |
| 9,510,322 B2 | 11/2016 | Doppler et al. |
| 9,521,621 B2 | 12/2016 | Krishnaswamy |
| 9,553,697 B2 | 1/2017 | Chen et al. |
| 9,596,596 B2 | 3/2017 | Rönneke |
| 9,614,641 B2 | 4/2017 | Geirhofer et al. |
| 9,621,323 B2 | 4/2017 | Han et al. |
| 9,806,789 B2 | 10/2017 | Khan et al. |
| 9,847,866 B2 | 12/2017 | Noh et al. |
| 10,098,028 B2 | 10/2018 | Hom et al. |
| 2002/0042290 A1 | 4/2002 | Williams et al. |
| 2003/0110436 A1 | 6/2003 | Golitschek Edler Von Elbwart et al. |
| 2003/0204582 A1 | 10/2003 | Shimoda et al. |
| 2004/0042436 A1 | 3/2004 | Terry et al. |
| 2004/0043794 A1 | 3/2004 | Nakaya et al. |
| 2004/0065744 A1 | 4/2004 | Shiraishi et al. |
| 2004/0252662 A1 | 12/2004 | Cho |
| 2005/0063331 A1 | 3/2005 | Kim et al. |
| 2005/0201325 A1 | 9/2005 | Kang et al. |
| 2005/0248685 A1 | 11/2005 | Seo et al. |
| 2005/0272472 A1 | 12/2005 | Goldberg et al. |
| 2006/0019710 A1 | 1/2006 | Ylitalo |

(56) References Cited

U.S. PATENT DOCUMENTS

| | | |
|---|---|---|
| 2006/0285927 A1 | 12/2006 | Hisgrove et al. |
| 2007/0025336 A1* | 2/2007 | Zhang ............... H04W 72/1231 370/352 |
| 2007/0047501 A1 | 3/2007 | Usuda et al. |
| 2007/0064708 A1 | 3/2007 | Usuda et al. |
| 2007/0217433 A1 | 9/2007 | Doppler et al. |
| 2007/0230375 A1 | 10/2007 | Yomo et al. |
| 2007/0253375 A1 | 11/2007 | Hamilton et al. |
| 2007/0254692 A1 | 11/2007 | McCoy |
| 2007/0268848 A1 | 11/2007 | Khandekar et al. |
| 2008/0025273 A1 | 1/2008 | Sano |
| 2008/0151792 A1 | 6/2008 | Taich et al. |
| 2008/0186895 A1 | 8/2008 | Shang et al. |
| 2008/0207161 A1 | 8/2008 | Upp et al. |
| 2008/0247535 A1 | 10/2008 | Li et al. |
| 2008/0274759 A1 | 11/2008 | Chen et al. |
| 2008/0298281 A1 | 12/2008 | Hunkeler |
| 2008/0305819 A1 | 12/2008 | Chun et al. |
| 2009/0017807 A1 | 1/2009 | Kwon et al. |
| 2009/0052397 A1 | 2/2009 | Meylan |
| 2009/0213765 A1 | 8/2009 | Rinne et al. |
| 2009/0219894 A1 | 9/2009 | Jee et al. |
| 2010/0008332 A1 | 1/2010 | Balachandran et al. |
| 2010/0039979 A1 | 2/2010 | Takase et al. |
| 2010/0041434 A1 | 2/2010 | Hirano |
| 2010/0074189 A1* | 3/2010 | Wang ............... H04W 72/1247 370/329 |
| 2010/0085926 A1 | 4/2010 | Harada et al. |
| 2010/0110942 A1 | 5/2010 | Cai et al. |
| 2010/0112178 A1 | 5/2010 | Fillmore et al. |
| 2010/0122444 A1 | 5/2010 | Reid et al. |
| 2010/0128727 A1 | 5/2010 | Takechi |
| 2010/0159822 A1 | 6/2010 | Lim et al. |
| 2010/0165939 A1 | 7/2010 | Lin et al. |
| 2010/0195651 A1 | 8/2010 | Dayong et al. |
| 2010/0215037 A1 | 8/2010 | Long et al. |
| 2010/0240312 A1 | 9/2010 | Peng et al. |
| 2010/0254340 A1 | 10/2010 | Park et al. |
| 2010/0254480 A1 | 10/2010 | Park et al. |
| 2010/0265896 A1 | 10/2010 | Park et al. |
| 2010/0296591 A1* | 11/2010 | Xu ..................... H04B 7/0613 375/259 |
| 2010/0310001 A1 | 12/2010 | Yeh et al. |
| 2011/0060956 A1 | 3/2011 | Goldsmith et al. |
| 2011/0075601 A1 | 3/2011 | Zheng |
| 2011/0085587 A1 | 4/2011 | Moulsley et al. |
| 2011/0098041 A1 | 4/2011 | Tomita et al. |
| 2011/0103495 A1 | 5/2011 | Hall |
| 2011/0110450 A1 | 5/2011 | Gomadam et al. |
| 2011/0116495 A1 | 5/2011 | Purkayastha et al. |
| 2011/0134841 A1 | 6/2011 | Shaheen |
| 2011/0169107 A1 | 7/2011 | Kramer et al. |
| 2011/0176443 A1 | 7/2011 | Asteley et al. |
| 2011/0194443 A1 | 8/2011 | Li et al. |
| 2011/0222445 A1 | 9/2011 | Alanara |
| 2011/0222523 A1 | 9/2011 | Fu et al. |
| 2011/0230144 A1 | 9/2011 | Siomina et al. |
| 2011/0243040 A1 | 10/2011 | Khan et al. |
| 2011/0249640 A1 | 10/2011 | Soong et al. |
| 2011/0268050 A1* | 11/2011 | Farajidana ......... H04L 25/0226 370/329 |
| 2011/0274012 A1 | 11/2011 | Jang et al. |
| 2011/0275381 A1 | 11/2011 | Moberg et al. |
| 2011/0319110 A1 | 12/2011 | Futaki |
| 2012/0003980 A1 | 1/2012 | Lim et al. |
| 2012/0004009 A1 | 1/2012 | Lindoff et al. |
| 2012/0044815 A1 | 2/2012 | Geirhofer et al. |
| 2012/0069778 A1 | 3/2012 | Zhang et al. |
| 2012/0076023 A1 | 3/2012 | Ko et al. |
| 2012/0106407 A1 | 5/2012 | Papasakellariou et al. |
| 2012/0113831 A1 | 5/2012 | Pelletier et al. |
| 2012/0113876 A1 | 5/2012 | Li et al. |
| 2012/0120905 A1 | 5/2012 | Ko et al. |
| 2012/0131168 A1 | 5/2012 | Foti |
| 2012/0134329 A1 | 5/2012 | Lim et al. |
| 2012/0154249 A1 | 6/2012 | Khojastepour et al. |
| 2012/0155335 A1 | 6/2012 | Khojastepour et al. |
| 2012/0155341 A1 | 6/2012 | Yamamoto et al. |
| 2012/0155404 A1 | 6/2012 | Shin et al. |
| 2012/0188976 A1 | 7/2012 | Kim et al. |
| 2012/0213183 A1 | 8/2012 | Chen et al. |
| 2012/0224497 A1 | 9/2012 | Lindoff et al. |
| 2012/0224553 A1 | 9/2012 | Kim et al. |
| 2012/0269134 A1 | 10/2012 | Jin et al. |
| 2012/0281566 A1 | 11/2012 | Pelletier et al. |
| 2012/0289178 A1 | 11/2012 | Matsumura et al. |
| 2012/0290650 A1 | 11/2012 | Montuno et al. |
| 2012/0302230 A1 | 11/2012 | Lim et al. |
| 2012/0320805 A1 | 12/2012 | Yang et al. |
| 2013/0012221 A1 | 1/2013 | Zou et al. |
| 2013/0021921 A1 | 1/2013 | He et al. |
| 2013/0029655 A1* | 1/2013 | Gao .................... H04L 5/0048 455/422.1 |
| 2013/0044621 A1 | 2/2013 | Jung et al. |
| 2013/0051277 A1 | 2/2013 | Hakola et al. |
| 2013/0053075 A1 | 2/2013 | Yoshizawa et al. |
| 2013/0058220 A1 | 3/2013 | Yi et al. |
| 2013/0073710 A1 | 3/2013 | Lee |
| 2013/0148526 A1 | 6/2013 | Hwang et al. |
| 2013/0160140 A1 | 6/2013 | Jin et al. |
| 2013/0188515 A1 | 7/2013 | Pinheiro et al. |
| 2013/0189932 A1 | 7/2013 | Shen et al. |
| 2013/0195066 A1 | 8/2013 | Lee et al. |
| 2013/0223301 A1 | 8/2013 | Lee et al. |
| 2013/0242822 A1 | 9/2013 | Yang et al. |
| 2013/0250843 A1 | 9/2013 | Zhou et al. |
| 2013/0268665 A1 | 10/2013 | Kips et al. |
| 2013/0279459 A1 | 10/2013 | Lee et al. |
| 2013/0315337 A1 | 11/2013 | Dai et al. |
| 2013/0322276 A1 | 12/2013 | Pelletier et al. |
| 2013/0336222 A1 | 12/2013 | Lu et al. |
| 2013/0343312 A1 | 12/2013 | Lv et al. |
| 2014/0003322 A1 | 1/2014 | Grinshoun et al. |
| 2014/0050176 A1 | 2/2014 | Lin et al. |
| 2014/0056220 A1 | 2/2014 | Poiteau et al. |
| 2014/0078939 A1 | 3/2014 | Shirani-Mehr et al. |
| 2014/0112194 A1 | 4/2014 | Novlan et al. |
| 2014/0120974 A1* | 5/2014 | Sediq ................. H04W 52/143 455/509 |
| 2014/0126581 A1 | 5/2014 | Wang et al. |
| 2014/0127991 A1 | 5/2014 | Lim et al. |
| 2014/0169232 A1 | 6/2014 | Aggarwal et al. |
| 2014/0169234 A1 | 6/2014 | Zhu et al. |
| 2014/0169315 A1 | 6/2014 | Han et al. |
| 2014/0177486 A1 | 6/2014 | Wang et al. |
| 2014/0211731 A1 | 7/2014 | Inoue et al. |
| 2014/0226552 A1 | 8/2014 | Niu et al. |
| 2014/0233541 A1 | 8/2014 | Kim et al. |
| 2014/0286297 A1 | 9/2014 | Zhao et al. |
| 2014/0301217 A1 | 10/2014 | Choi et al. |
| 2014/0355493 A1 | 12/2014 | Niu et al. |
| 2015/0078465 A1 | 3/2015 | Yi et al. |
| 2015/0110048 A1* | 4/2015 | Damnjanovic ..... H04W 72/048 370/329 |
| 2015/0139292 A1 | 5/2015 | Shirani-Mehr et al. |
| 2016/0094318 A1* | 3/2016 | Shattil ................ H04B 7/026 375/267 |
| 2016/0099802 A1 | 4/2016 | Noh et al. |
| 2016/0242048 A1 | 8/2016 | Pelletier et al. |
| 2017/0223687 A1* | 8/2017 | Kuchibhotla ....... H04W 72/044 |
| 2018/0146500 A1* | 5/2018 | Muraoka .............. H04W 76/14 |
| 2019/0349945 A1* | 11/2019 | Yeh ...................... H04L 5/0057 |

FOREIGN PATENT DOCUMENTS

| | | |
|---|---|---|
| AU | 2002327863 A1 | 4/2004 |
| BR | 112012024188 A2 | 7/2016 |
| CN | 101444016 A | 5/2009 |
| CN | 102170703 A | 8/2011 |
| CN | 102215084 A | 10/2011 |
| CN | 102355732 A | 2/2012 |
| CN | 102378385 A | 3/2012 |
| CN | 102469596 A | 5/2012 |

(56) References Cited

FOREIGN PATENT DOCUMENTS

| | | |
|---|---|---|
| CN | 101431737 B | 7/2012 |
| CN | 101784116 B | 7/2012 |
| CN | 101414919 B | 11/2012 |
| CN | 102137105 B | 11/2012 |
| CN | 102118789 B | 2/2013 |
| CN | 101873630 B | 4/2013 |
| CN | 102170338 B | 9/2013 |
| CN | 102118692 B | 2/2014 |
| CN | 104350778 A | 2/2015 |
| CN | 102421172 B | 4/2015 |
| CN | 102395205 B | 5/2015 |
| CN | 102742216 B | 5/2015 |
| CN | 102395206 B | 7/2015 |
| CN | 102651678 B | 7/2015 |
| CN | 102123019 B | 11/2015 |
| CN | 103299571 B | 12/2015 |
| CN | 103262456 B | 1/2016 |
| CN | 102714861 B | 3/2016 |
| CN | 103299601 B | 4/2016 |
| CN | 102918793 B | 5/2016 |
| CN | 106028271 A | 10/2016 |
| CN | 102111246 B | 3/2017 |
| CN | 103238289 B | 3/2017 |
| CN | 103891182 B | 9/2017 |
| CN | 104205948 B | 8/2018 |
| CN | 105846875 B | 4/2019 |
| DE | 102008040521 A1 | 1/2010 |
| DE | 60143172 | 11/2010 |
| DK | 2675095 T3 | 10/2016 |
| DK | 2849378 T3 | 3/2019 |
| EP | 1655986 A2 | 5/2006 |
| EP | 1826949 A1 | 8/2007 |
| EP | 1892880 A1 | 2/2008 |
| EP | 1969774 A2 | 9/2008 |
| EP | 2157824 A1 | 2/2010 |
| EP | 2237633 A1 | 10/2010 |
| EP | 2302963 A1 | 3/2011 |
| EP | 2494832 A1 | 5/2012 |
| EP | 2496026 A2 | 9/2012 |
| EP | 2515463 A1 | 10/2012 |
| EP | 2340621 B1 | 12/2012 |
| EP | 2545694 A1 | 1/2013 |
| EP | 2466836 A4 | 3/2013 |
| EP | 2432290 B1 | 5/2013 |
| EP | 2273827 B1 | 7/2013 |
| EP | 2629564 A1 | 8/2013 |
| EP | 2395785 B1 | 12/2013 |
| EP | 2302963 A4 | 1/2014 |
| EP | 2395785 B8 | 2/2014 |
| EP | 2537374 A4 | 2/2014 |
| EP | 2793418 A3 | 12/2014 |
| EP | 2747304 A4 | 2/2015 |
| EP | 2496026 A4 | 4/2015 |
| EP | 2856797 A1 | 4/2015 |
| EP | 2761796 A4 | 7/2015 |
| EP | 2888922 A2 | 7/2015 |
| EP | 2894801 A1 | 7/2015 |
| EP | 2795977 A4 | 10/2015 |
| EP | 2183870 B1 | 11/2015 |
| EP | 2490463 B1 | 12/2015 |
| EP | 2424288 A4 | 7/2016 |
| EP | 2484027 B1 | 3/2017 |
| EP | 2536221 B1 | 3/2017 |
| EP | 3190837 A1 | 7/2017 |
| EP | 2647154 A4 | 9/2017 |
| EP | 3249996 A1 | 11/2017 |
| EP | 2161887 B1 | 9/2018 |
| EP | 2849378 B1 | 11/2018 |
| EP | 2486671 B1 | 12/2018 |
| EP | 3419206 A1 | 12/2018 |
| EP | 2486671 B8 | 3/2019 |
| EP | 2617258 B1 | 3/2019 |
| ES | 2419804 T3 | 8/2013 |
| ES | 2450758 T3 | 3/2014 |
| GB | 0508057 | 6/2005 |
| GB | 0816449 | 10/2008 |
| GB | 0902314 | 4/2009 |
| GB | 201010821 | 3/2011 |
| GB | 2476415 B | 11/2011 |
| GB | 2472771 B | 5/2012 |
| GB | 2485348 A | 5/2012 |
| GB | 2489553 B | 1/2013 |
| GB | 2496179 B | 1/2014 |
| GB | 2474503 B | 5/2014 |
| GB | 2496153 B | 7/2014 |
| GB | 2485232 B | 2/2015 |
| IL | 206008 | 2/2011 |
| IT | PI20010039 A1 | 11/2002 |
| JP | 2000047968 A | 2/2000 |
| JP | 2004040651 A | 2/2004 |
| JP | 2004096346 A | 3/2004 |
| JP | 3730658 B2 | 1/2006 |
| JP | 4058322 B2 | 3/2008 |
| JP | 2008263335 A | 10/2008 |
| JP | 4545768 B2 | 9/2010 |
| JP | 4592547 B2 | 12/2010 |
| JP | 2011055105 A | 3/2011 |
| JP | 4684045 B2 | 5/2011 |
| JP | 5170244 B2 | 3/2013 |
| JP | 5199223 B2 | 5/2013 |
| JP | 5228119 B2 | 7/2013 |
| JP | 5245761 B2 | 7/2013 |
| JP | 5309430 B2 | 10/2013 |
| JP | 5360193 B2 | 12/2013 |
| JP | 2014053812 A | 3/2014 |
| JP | 5490227 B2 | 5/2014 |
| JP | 5537000 B2 | 7/2014 |
| JP | 5580421 B2 | 8/2014 |
| JP | 5589098 B2 | 9/2014 |
| JP | 5669854 B2 | 2/2015 |
| JP | 5732753 B2 | 6/2015 |
| JP | 5856961 B2 | 2/2016 |
| JP | 5873503 B2 | 3/2016 |
| JP | 5964314 B2 | 8/2016 |
| KR | 20050029254 A | 3/2005 |
| KR | 100547734 B1 | 1/2006 |
| KR | 100754658 B1 | 9/2007 |
| KR | 100795061 B1 | 1/2008 |
| KR | 20080041535 A | 5/2008 |
| KR | 100937432 B1 | 1/2010 |
| KR | 100945410 B1 | 3/2010 |
| KR | 100959645 B1 | 5/2010 |
| KR | 101012448 B1 | 2/2011 |
| KR | 101127146 B1 | 3/2012 |
| KR | 20120047204 A | 5/2012 |
| KR | 101168635 B1 | 7/2012 |
| KR | 101191216 B1 | 10/2012 |
| KR | 20130063694 A | 6/2013 |
| KR | 101435844 B1 | 8/2014 |
| KR | 101479263 B1 | 1/2015 |
| KR | 101489108 B1 | 2/2015 |
| KR | 20150048180 A | 5/2015 |
| KR | 101561063 B1 | 10/2015 |
| KR | 101609580 B1 | 4/2016 |
| KR | 101268200 B1 | 5/2016 |
| KR | 101632559 B1 | 6/2016 |
| KR | 101740447 B1 | 5/2017 |
| KR | 101746668 B1 | 6/2017 |
| KR | 101792509 B1 | 11/2017 |
| KR | 101863927 B1 | 7/2018 |
| KR | 101948348 B1 | 2/2019 |
| NZ | 547898 A | 12/2006 |
| PL | 2651067 T3 | 6/2015 |
| RU | 2341018 C2 | 12/2008 |
| RU | 2345414 C1 | 1/2009 |
| RU | 105492 U1 | 6/2011 |
| RU | 2562768 C2 | 9/2015 |
| RU | 2683493 C2 | 3/2019 |
| SE | 0300047 | 1/2003 |
| SG | 143988 A1 | 7/2008 |
| TW | 200835357 A | 8/2008 |
| TW | 201032531 A | 9/2010 |
| TW | 201125334 A | 7/2011 |
| TW | I610552 B | 1/2018 |

(56) References Cited

FOREIGN PATENT DOCUMENTS

| | | |
|---|---|---|
| WO | WO-03059729 A1 | 7/2003 |
| WO | WO-2004008693 A1 | 1/2004 |
| WO | WO-2005104386 A1 | 11/2005 |
| WO | WO-2005120101 A1 | 12/2005 |
| WO | 2006106378 A1 | 10/2006 |
| WO | WO-2006106378 A1 | 10/2006 |
| WO | WO-2007105089 A2 | 9/2007 |
| WO | WO-2008135934 A1 | 11/2008 |
| WO | WO-2010002305 A1 | 1/2010 |
| WO | 20100029354 A1 | 3/2010 |
| WO | WO-2010029354 A1 | 3/2010 |
| WO | 2010076604 A1 | 7/2010 |
| WO | WO-2010104433 A1 | 9/2010 |
| WO | WO-2010121539 A1 | 10/2010 |
| WO | WO-2010123304 A1 | 10/2010 |
| WO | WO-2011019228 A2 | 2/2011 |
| WO | WO-2011038352 A1 | 3/2011 |
| WO | WO-2011043298 A1 | 4/2011 |
| WO | WO-2011053056 A2 | 5/2011 |
| WO | WO-2011056828 A1 | 5/2011 |
| WO | WO-2011091039 A1 | 7/2011 |
| WO | WO-2011094954 A1 | 8/2011 |
| WO | WO-2011098150 A1 | 8/2011 |
| WO | WO-2011136266 A1 | 11/2011 |
| WO | WO-2011137408 A2 | 11/2011 |
| WO | WO-2011159102 A2 | 12/2011 |
| WO | WO-2011159799 A2 | 12/2011 |
| WO | WO-2012060629 A2 | 5/2012 |
| WO | WO-2012060649 A2 | 5/2012 |
| WO | WO-2012068465 A1 | 5/2012 |
| WO | WO-2012149321 A1 | 11/2012 |
| WO | WO-2012177002 A2 | 12/2012 |
| WO | WO-2013009154 A2 | 1/2013 |
| WO | WO-2013095355 A1 | 6/2013 |
| WO | 2014008106 A1 | 1/2014 |
| WO | 2014056137 A1 | 4/2014 |
| WO | 2014130137 A1 | 8/2014 |
| WO | 2014179979 A1 | 11/2014 |
| WO | 2014200262 A1 | 12/2014 |
| WO | 2015039293 A1 | 3/2015 |
| WO | 2015072903 A1 | 5/2015 |
| WO | 2015180773 A1 | 12/2015 |
| WO | 2017171746 A1 | 10/2017 |

OTHER PUBLICATIONS

Motorola Mobility, "Downlink MIMO CSI Enhancements for Release-11", R1-112445, Aug. 2011, 4 pages, Agenda Item 6.6.2.1, 3GPP TSG RAN1 #66, Athens, Greece.

Intel Corporation, "LTE TDD eIMTA feasibility analysis", R4-140604, Feb. 2014, 6 pages, 3GPP TSG-RAN WG4, Prague, Czech Republic.

Mahmood, N. et al., "On the Potential of Full Duplex Communication in 5G Small Cell Networks", 2015, 5 pages, IEEE 81st Vehicular Technology Conference (VTC Spring).

Han, S. et al., "Full Duplex: Coming into Reality in 2020?", 2014, 6 pages, Globecom Wireless Networking Symposium.

Kini, A. V. et al., "A Dynamic Subframe Set Power Control Scheme for Interference Mitigation in Reconfigurable TD-LTE Systems", 2014, 6 pages, 23rd Wireless and Optical Communication Conference (WOCC).

Choi et al.: "Simultaneous Transmission and Reception: Algorithm, Design and System Level Performance", IEEE Transaction On Wireless Communications, Oct. 28, 2013, vol. 12, No. 12, pp. 5992-6010.

Shao et al.: "Analysis of carrier utilization in full-duplex cellular networks by dividing the co-channel interference region", IEEE Communications Letter, Apr. 24, 2014, vol. 18, No. 6, pp. 1043-1046.

Goyal et al.: "Full Duplex Cellular Systems: Will Doubling Interference Prevent Doubling Capacity?", IEEE Communications Magazine, May 14, 2015, pp. 121-127.

Ohto et al.: "Generalized PF Scheduling for Bidirectional and User-Multiplexing Unidirectional Full-duplex Links", In: 21st Asia-Pacific Conference on Communications (APCC), Oct. 2015, pp. 359-363.

So et al.: "Joint Proportional Fair Scheduling for Uplink and Downlink in Wireless Networks", In: IEEE 73rd Vehicular Technology Conference (VTC Spring), May 2011, 4 pages.

Kavitha et al.: "Fair Scheduling in Celluar Systems in the Presence of Noncooperative Mobiles", In: 2010 Proceedings IEEE, INFOCOM, Mar. 2010, 9 pages.

First Search Report for the corresponding Chinese Patent Application No. 2013800291015 dated Nov. 23, 2016 (1 page) (for reference purpose only).

International Search Report for corresponding PCT Application PCT/US2013/048345 dated Oct. 16, 2013, (3 pages) (for reference purpose only).

Han et al.: "Full Duplex Networking: Mission Impossible?", IEEE Communications Magazine, Oct. 20, 2014, 6 pages.

Goyal et al.: "Full Duplex Operation for Small Cells", IEEE Transactions on Vehicular Technology, Sep. 30, 2019, 34 pages.

International Search Report for corresponding PCT Application PCT/US2016/038594 dated Mar. 17, 2017 (4 pages). (for reference purpose only).

Chen et al.: "A Closed-Loop UL Power Control Scheme for Interference Mitigation in Dynamic TD-LTE Systems", Vehicular Technology Conference, May 2015, 5 pages.

Supplementary Partial European Search Report for corresponding EP Patent Application No. EP13812518 dated Feb. 1, 2016, 1 page (for reference purpose only).

Information Disclosure Statement submitted for the corresponding U.S. Appl. No. 14/125,256 dated Mar. 7, 2014, 4 pages (for reference purpose only).

Non-final Office Action for the corresponding U.S. Appl. No. 14/125,256 dated Dec. 18, 2015, 10 pages (for reference purpose only).

Information Disclosure Statement submitted for the corresponding U.S. Appl. No. 14/125,256 dated Jun. 21, 2016, 1 page (for reference purpose only).

Final Office Action for the corresponding U.S. Appl. No. 14/125,256 dated Jul. 28, 2016, 6 pages (for reference purpose only).

Notice of Allowance or the corresponding U.S. Appl. No. 14/125,256 dated Oct. 25, 2016, 8 pages (for reference purpose only).

\* cited by examiner

COMMUNICATION DEVICE AND A METHOD FOR FULL DUPLEX SCHEDULING

RELATED APPLICATIONS

The present application is a National Stage Application of International Application No.: PCT/US2016/038594 filed on Jun. 22, 2016 and is incorporated herein by reference in its entirety.

TECHNICAL FIELD

Various aspects of this disclosure relate generally to a method and a device for wireless communications.

BACKGROUND

In wireless communication system such as a Long Term Evolution (LTE) systems, a mobile terminal (referred to as a User Equipment or UE) connects to a cellular network via a base station (referred to as an evolved Node B or eNB). Conventional radio transceivers are generally not capable of receiving and transmitting on the same frequency at the same time due to interference between the transmitter (Tx) and the receiver (Rx). Most current communications systems, including LTE systems, are designed as half duplex (HD) system in each channel with bidirectional transmissions being sent over two orthogonal HD channels. The orthogonality may be provided, for example, by time multiplexing or frequency multiplexing (e.g., time division duplex (TDD) or frequency division duplex (FDD)). Full duplex techniques which support simultaneous transmit and receive in the same frequency at the same time can potentially double the spectrum efficiency. Compared to half-duplex (HD), a FD system is associated with significant interference between its transmission and receiver chain. Recent techniques from industry and academics demonstrate more than 120 dB interference cancellation for FD systems and thus enables the potential applications of FD operation in real wireless cellular systems. Also compared with a point-to-point FD system, a FD cellular network has more complicated interference environments. Additional types of interference occur, including base station to base station (BS-to-BS) interference in the uplink receiver and UE-to-UE interference in the downlink receiver. The interference problem can be addressed by properly designed schedulers at the base station.

BRIEF DESCRIPTION OF THE DRAWINGS

The disclosure is explained in greater detail below on the basis of exemplary embodiments, wherein also as before no distinction will be drawn specifically among the claim categories and the features in the context of the independent claims are intended also to be disclosed in other combinations. In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

DETAILED DESCRIPTION

Figure 1:
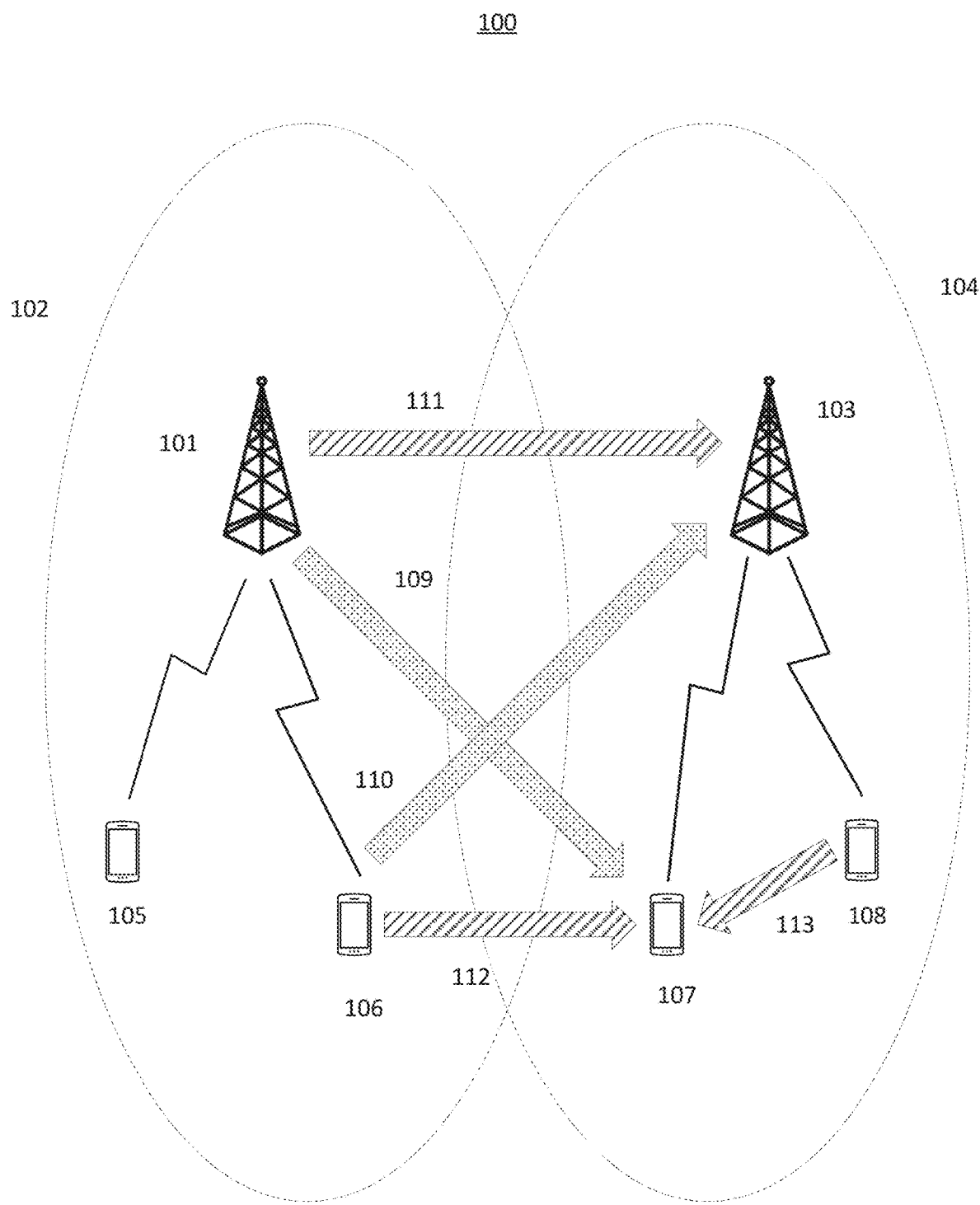
FIG. 1 shows an exemplary Full Duplex (FD) communication network in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component including one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

Downlink transmission from neighboring base stations may greatly impact uplink reception of the serving base station (BS) in an FD cellular system, this is referred to as BS-to-BS interference. Since BS-to-BS channel is closer to line-of-sight with much smaller pathloss and also the transmit power and antenna gain at BS is much larger than those of mobile devices (MDs), the BS-to-BS interferences may easily dominate a desired weak UL signal. BS-to-BS interference may be greatly mitigated by antenna nulling technique and UL power control.

Aspects of this disclosure relate to mitigate the MD-to-MD interference problem. For cellular systems such as LTE, MDs transmitting an UL signal may create conventional co-channel interference to other UL signals in other cells. Yet for FD cellular systems, an UL signal may create interference to a DL signal, especially a DL signal nearby, that is, MD-to-MD interference. Such interference may corrupt the victim DL signal. From the perspective of a user perceived service quality, cell edge MDs in high-density indoor environments, e.g. cafeteria, airport etc., are particularly vulnerable to severe performance degradation caused by MD-to-MD interference. This is because stationary MDs in such environment are likely to transmit/receive persistently for a long period of time, resulting in a prolonged service disruption due to strong interference. Such service disruption caused by MD-to-MD interference has to be properly handled to truly utilize the benefits of FD capability. The interference environment in an FD system will be described later in more detail with reference to FIG. 1.

In an aspect of this disclosure, scheduling methods for an FD cellular system reusing an existing cellular architecture are presented, including how to obtain the novel scheduling metrics for joint DL-UL scheduling, the procedures to obtain rank indicator/precoding matrix indicator/channel quality indicator (RI/PMI/CQI) information in joint schedulers for a FD cellular system and various variation of the joint DL-UL scheduling based on different signaling overhead, performance tradeoff, timing constraint and MD capability. Specifically, a concurrent joint DL-UL scheduler, DL-prioritized scheduler, UL-prioritized scheduler and FD bundle scheduler is disclosed. The disclosed joint schedulers which jointly schedule a pair of UL and DL mobile devices can achieve high spectrum efficiency for various channel models and deployment environments. The scheduling methods will be described later in more detail with reference to FIG. 2

FIG. 1 shows a cellular communication network 100 in an aspect of this disclosure. It is appreciated that cellular communication network 100 is exemplary in nature and thus may be simplified for purposes of this explanation. Cellular communication network 100 illustrates an example of several types of interference that can occur in such a network. The network includes base station 101 that provides a FD air interface to serve FD cell 102 and base station 103 that provides a FD air interface to serve FD cell 104. Cell 102 includes a MD configured DL transmission; that is DL-MD 105. Cell 102 further includes a MD configured for UL transmission; that is UL-MD 106. Cell 104 includes a MD configured for DL transmission; that is DL-MD 107. Cell 104 further includes a MD configured for UL transmission; that is UL-MD 108. At any time instant, base station 103 may receive a UL transmission from UL-MD 108 and send a DL transmission to DL-MD 107. At the same time instant, base station 101 may receive a UL transmission from UL-MD 106 and send a DL transmission to DL-MD 105.

Conventional interferences that may occur in HD systems are represented by the arrows 109 and 110. Arrow 109 represents conventional interference between the DL transmission from base station 101 and the DL transmission from the base station 103. Arrow 109 points to DL-MD 107 because the quality of reception at DL-MD 107 of the DL transmission from base station 103 will be affected by the interference represented by arrow 109. Arrow 109 originates at base station 101 because the DL transmission that interferes with reception at DL-MD 107 is being sent from base station 101.

Arrow 110 represents conventional interference between the UL transmission from UL-MD 106 and the UL transmission from UL-MD 108. Arrow 110 points to base station 103 because the quality of reception at base station 103 of the UL transmission from UL-MD 108 will be affected by the interference represented by arrow 110. Arrow 110 originates at UL-MD 106 because the UL transmission that interferes with reception at the cellular base station 103 is being sent from UL-MD 106. Hence, conventional interference of HD systems tends to be either between DL transmissions of two neighboring cells or between UL transmissions of two neighboring cells (though other types of interference can occur in neighboring HD cells that are asynchronously deployed).

In FD systems, additional types of interference can occur. Some of these FD types of interference (FD-interferences) are represented by the arrows 111, 112 and 113.

Arrow 111 represents FD-interference between the DL transmission sent by base station 101 and UL transmission sent by UL-MD 108. Arrow 111 points to base station 103 because the quality of reception at base station 103 of the UL transmission from UL-MD 108 will be affected by the interference represented by arrow 111. Arrow 111 originates at cellular base station 101 because the DL transmission that interferes with reception at base station 103 is being sent from base station 103. Arrow 111 represents inter-cell BS-BS interference.

Arrow 112 represents FD-interference between the UL transmission sent by UL-MD 106 and the DL transmission sent by base station 103. Arrow 112 points to DL-MD 107 because the quality of reception at DL-MD 107 of the DL transmission from base station 103 will be affected by the interference represented by the arrow 112. Arrow 112 originates at UL-MD 106 because the UL transmission that interferes with reception at DL-MD 107 is being sent from UL-MD 106. Arrow 112 represents inter-cell MD-MD interference.

Arrow 113 represents FD-interference between the UL transmission sent by UL-MD 108 and the DL transmission sent by base station 103. Arrow 113 points to DL-MD 107 because the quality of reception at DL-MD 107 of the DL transmission from base station 103 will be affected by the interference represented by arrow 113. Arrow 113 originates at UL-MD 108 because a UL transmission that interferes with reception at DL-MD 107 is being sent from UL-MD 108. Arrow 113 represents intra-cell MD-MD interference.

Hence, as shown in the example of FIG. 1, FD systems can experience interference between DL and UL transmissions in addition to interference between DL and DL transmissions and interference between UL and UL transmissions. For the purposes of this disclosure, the terms "BS-to-BS interference" and "eNB-to-eNB interference" will be used to refer to interference between DL traffic sent from one or more cellular base stations (e.g., eNBs evolved node Bs) and UL traffic sent to a cellular base station (whose reception of the UL traffic is affected by the eNB-to-eNB interference). In addition, the term "MD-to-MD interference" and "UE-to-UE interference" will be used to refer to interference between UL traffic sent to one or cellular base stations and DL traffic sent from a cellular base station to a MD (whose reception of the DL traffic is affected by the MD-to-MD interference).

Depending on various level of knowledge of MD-to-MD interference available at a base station, approaches to handle the MD-to-MD interference include both non-coordinative schemes and coordinative joint scheduler to intelligently schedule MDs with little expected MD-to-MD interferences for simultaneous transmission and reception. A detailed approach for novel joint schedulers for a FD cellular system will be presented with reference to FIG. 2. The joint scheduler may be based on existing LTE systems and may process feedback information from a MD to be scheduled.

Figure 2:
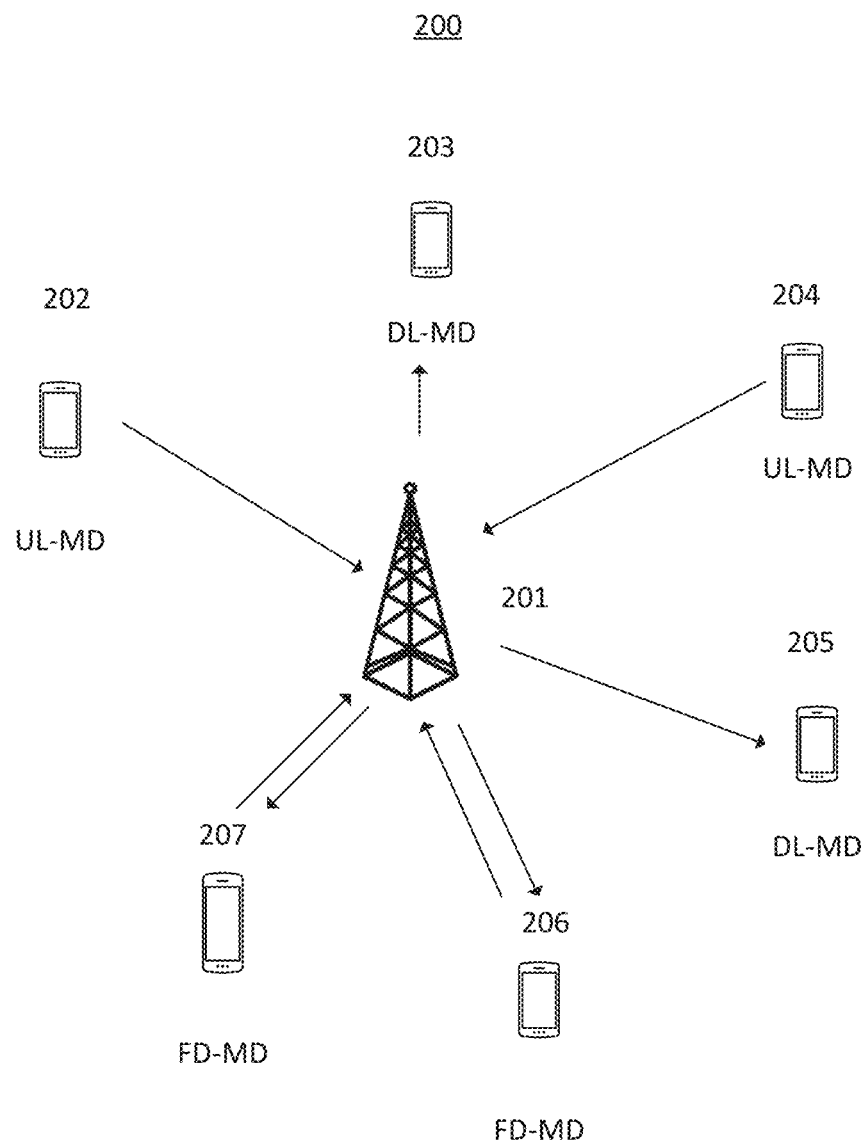
FIG. 2 shows an exemplary communication network scenario in an aspect of this disclosure.

FIG. 2 shows a FD cellular system 200 including base station 201, UL-MD 202, DL-MD 203, UL-MD 204, DL-MD 205, FD-MD 206 and FD-MD 207. An FD-MD has full duplex capability, i.e. the FD-MD may transmit and receive at the same time and frequency. Base station 201 may schedule a radio channel resource to an UL-MD and to a DL-MD or alternatively to a FD-MD.

Figure 3:
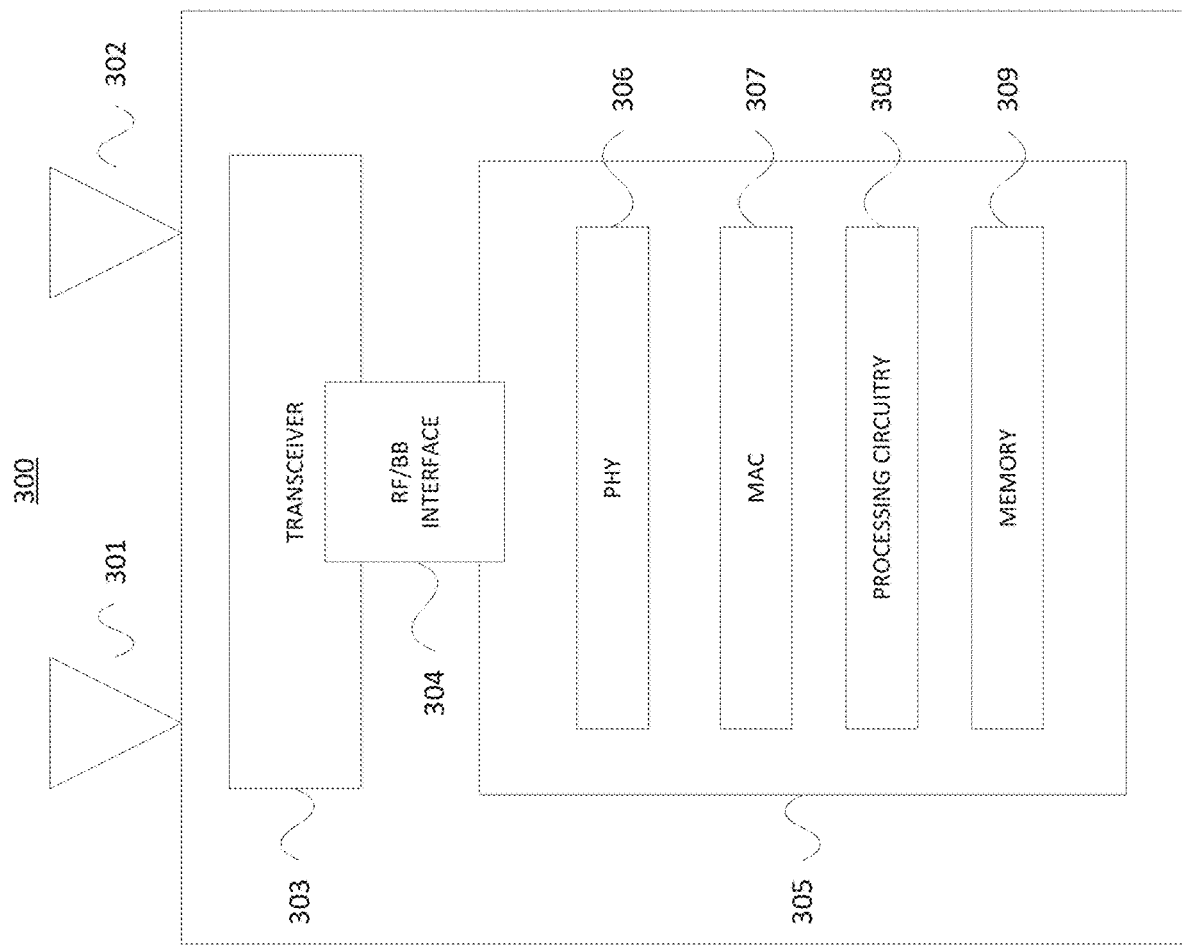
FIG. 3 shows an exemplary system model of a communication device in an aspect of this disclosure.

FIG. 3 shows a block diagram of a communication device 300 in an aspect of this disclosure. The communication device 300 may be MD or a base station, for example such as DL-MD 204 and base station 201 of FIG. 2. The communication device may include a radio frequency (RF) unit 303 interfaced to baseband (BB) unit 305 via RF-BB interface 304. RF unit 303 may include a transceiver configured to provide a full duplex air interface to antennas 301 and 302. The transceiver circuitry may perform various transmission and reception functions such as conversion of signals between a BB range and a RF range. The antennas 301 and 302 may include one or more directional or omnidirectional antennas, including, for example, dipole antennas, monopole antennas, microstrip antennas or other types of suitable antennas suitable for transmission of RF signals. In some MIMO configurations, antennas 301 and 302 may be effectively separated to take advantage of spatial diversity.

The physical layer (PHY) circuitry 306 may perform various encoding and decoding functions that may include formation of baseband signals for transmission and decoding of received signals. The communication 300 may also include medium access control layer (MAC) circuitry 307 configured to control access to the wireless medium. The communication device 300 may also include processing circuitry 308, such as one or more single-core or multi-core processors, and memory 309 arranged to perform operations described herein. Processing circuitry may include a scheduler. The physical layer circuitry 306, MAC circuitry 308 may handle various radio control functions that enable communication with one or more radio networks compatible with one or more radio technologies. The radio control functions may include signal modulation, encoding, decoding, radio frequency shifting, etc. The communication device may be configured to operate in accordance with 3GPP standards or other protocol standards, including WiMax, WiFi, WiGig, GSM, EDGE, GERAN, UMTS, UTRAN or other 3G, 4G, 5G, etc. technologies either already developed or to be developed.

Although communication device 300 is illustrated as having several separate functional elements, one or more of the functional elements may be combined and may be implemented by combinations of software-configured elements, such as processing elements including DSPs, and/or other hardware elements. For example, some elements may include one or more microprocessors, DSPs, FPGAs, ASICs, RFICs and combinations of various hardware and logic circuitry for performing at least the functions described herein. In some aspects of this disclosure, the functional elements may refer to one or more processes operating on one or more processing elements. Various examples may be implemented in one or a combination of hardware, firmware and software. Various examples may also be implemented as instructions stored on a computer readable storage device, which may be read and executed by at least one processor to perform the operations described herein.

Figure 7:
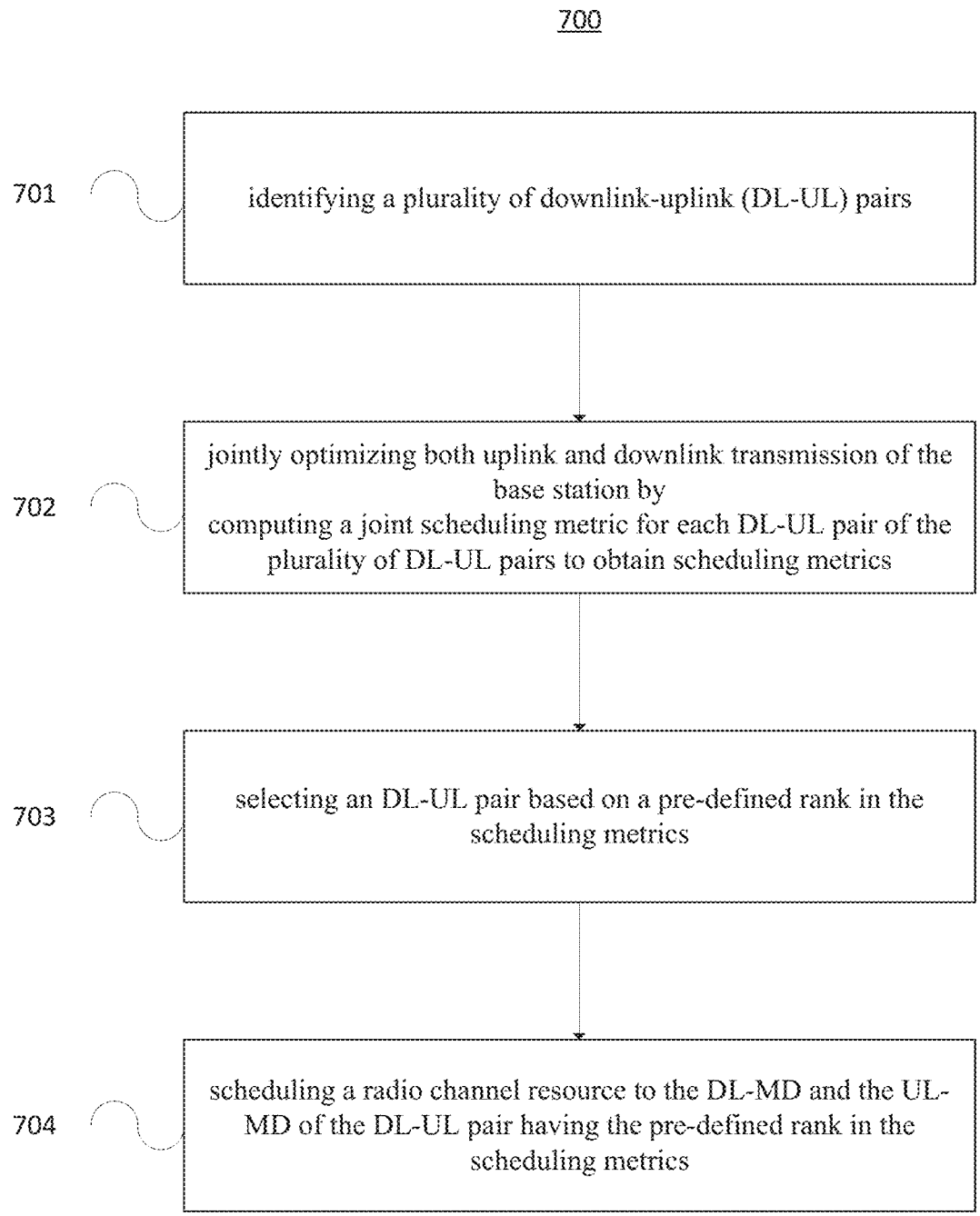
FIG. 7 shows a flowchart of a method for operating a base station in a FD cellular system in an aspect of this disclosure.

Now referring back to FIG. 2 base station 201 may be a cellular base station configured to provide a full duplex air interface in full duplex (FD) cellular system 200. The processing circuitry, specifically the scheduler, of base station 201 may be configured to perform a method as shown in FIG. 7. As in stage 701 the method includes identifying a plurality of downlink-uplink (DL-UL) pairs, wherein each DL-UL pair includes a mobile device configured for downlink transmission (DL-MD) of a plurality of DL-MDs and a mobile device configured for uplink transmission (UL-MD) of a plurality of UL-MDs. As in stage 702, the method further includes optimizing both uplink and downlink traffic of the base station by computing a joint scheduling metric for each DL-UL pair of the plurality of DL-UL pairs to obtain scheduling metrics. As in stage 703, the method further includes selecting an DL-UL pair having a pre-defined rank in the scheduling metrics. As in stage 704 the method even further includes scheduling a radio channel resource to the DL-MD and the UL-MD of the DL-UL pair having the pre-defined rank in the scheduling metrics. The pre-defined rank may be a highest rank.

The scheduling metrics thus may contain information for both directions of traffic. In addition MD-to-MD interference may impact the values of the joint scheduling metric for a DL-MD when pairing with different UL-MDs. For example, discarding FD-MDs 206 and 207 for the moment, the scheduler of base station 201 may identify the following DL-UL pairs: (DL-MD 203, UL-MD 202), (DL-MD 203, UL-MD 204), (DL-MD 205, UL-MD 202), (DL-MD 205, UL-MD 204). The scheduler may compute a joint scheduling metric for each of those DL-UL pairs. Assuming the scheduling metric of DL-UL pair (DL-MD 205, UL-MD 202) is the highest, the scheduler would schedule a radio channel resource to DL-UL pair (DL-MD 205, UL-MD 202). A DL-UL pair may experience high interference. For example, DL-UL pair (DL-MD 203, UL-MD 202) may experience high interference. Then, DL-MD 203 and UL-MD 202 are regarded as non-pairable.

The cellular communication network may be an LTE compliant network. The communication over an LTE compliant may be split up into 10 ms frames, each of which may contain ten 1 ms sub-frames. Each sub-frame of the frame, in turn, may contain two slots of 0.5 ms. Each sub-frame may be used for uplink (UL) communications from the MD to the base station as well as downlink (DL) communications from the base station to the MD. Each slot of the sub-frame may contain 6-7 OFDM symbols, depending on the system used.

The sub-frame may contain 12 or more subcarriers. A downlink resource grid may be used for downlink transmissions as well as for uplink transmissions from the base station to MDs. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements. An RB may be the smallest unit of channel resources that can be allocated to a MD. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth.

The scheduler in the BS may jointly optimize both uplink and downlink traffic and be implemented as a guarantee fairness scheduler, specifically an alpha fair scheduler. Generally, the α-fair scheduler targets to maximize the objective function of sum α-fair throughput: $\Sigma_u f_\alpha(TP_u)$, where $TP_u$ denote the throughput of user u. The α-fair throughput, $f_\alpha(TP_u)$, is defined as $$f_\alpha(TP_u) = \begin{cases} \frac{(TP_u)^{1-\alpha}}{1-\alpha}, & \text{for } \alpha \neq 1; \\ \log(TP_u), & \text{for } \alpha = 1 \end{cases}$$

The special case of α=1 is known as proportional-fair scheduling.

The special case of α=0 is known as Max-Sum-Throughput scheduling.

The special case of α→∞ is known as Max-Min-Throughput scheduling.

In a conventional HD system, uplink and downlink traffic may be scheduled independently. For example, when scheduling for downlink resource blocks (RBs), the scheduler will select the DL-MD that optimizes the downlink objective function: $\max \Sigma_u f_\alpha(TP_u^{(DL)})$. The scheduling strategy for an α-fair scheduling metric can be found via solving the optimization problem. The scheduling metric may be $$\frac{R_u^{(DL)}(RB_i)}{(RTP_u^{(DL)})^\alpha}$$

and the DL-MD with the highest scheduling metric may be selected to transmit on RB i. Here $R_u^{(DL)}(RB_i)$ is the downlink rate estimation of user u on RB i and $RTP_u^{(DL)}$ is the recent DL throughput of user u. The notation (DL) can be changed to (UL) when scheduling UL transmission.

In an FD System, when jointly scheduling downlink and uplink transmission, the objective function needs to consider both uplink and downlink. The joint scheduler metric can be computed depending on how fairness for uplink and downlink traffic is defined. Two different cases are described below:

A first case is directed to guarantee fairness across all MDs where downlink and uplink resource usage, i.e. total throughput from downlink and uplink, are jointly considered. Thus, fairness is considered on a per mobile device basis. The optimization target is to guarantee that each mobile device is allocated a fair amount of resource, but it does not guarantee that fairness between the resource allocated for downlink and the resource allocated for uplink is considered.

Jointly optimizing both uplink and downlink transmission may be achieved by optimizing the following optimization target:

$$\sum_u f_\alpha(w_{DL} \cdot TP_u^{(DL)} + w_{UL} \cdot TP_u^{(UL)})$$

$f_\alpha$ denotes an alpha-fair throughput of user u, wherein user u can be a DL-MD or an UL MD.

$w_{DL}$ denotes a downlink weight indicating a preciousness of downlink resources.

$w_{UL}$ denotes an uplink weight indicating a preciousness of uplink resources.

$TP_u^{(DL)}$ denotes a downlink throughput of user u and $TP_u^{(UL)}$ denotes an uplink throughput of user u.

As above, the optimization target may be defined as a summation over all mobile devices (user) of a sum of an alpha fair total throughput of a mobile device (user). The total throughput may be given by sum of a weighted downlink throughput and a weighted uplink throughput.

After solving the optimization problem, the new joint scheduling metric for each UL-DL pair $(u_1,u_2)$ of DL-MD $u_1$ and UL-MD $u_2$ on RB i may be given by:

$$\frac{w_{DL} \cdot R_{u_1,(UL-MD=u_2)}^{(DL)}(RB_i) + w_{UL} \cdot R_{u_2,(DL-MD=u_1)}^{(UL)}(RB_i)}{\left(w_{DL} \cdot RTP_{u_1}^{(DL)} + w_{UL} \cdot RTP_{u_2}^{(UL)}\right)^\alpha}$$

$RB_i$ denotes an i-th resource block of a channel resource to be scheduled, $w_{DL}$ denotes a downlink weight indicating a preciousness of downlink resources, $w_{UL}$ denotes an uplink weight indicating a preciousness of uplink resources, $R_{u_1,(UL-MD=u_2)}^{(DL)}(RB_i)$ denotes a data rate estimation of $u_1$ when pairing with an UL-MD of $u_2$ on $RB_i$, $R_{u_2,(DL-MD=u_1)}^{(UL)}(RB_i)$ denotes a data rate estimation of a UL-MD of $u_2$ when pairing with a DL-MD of $u_2$ on $RB_i$, $RTP_{u_1}^{(DL)}$ denotes a recent downlink throughput of $u_1$, and $RTP_{u_2}^{(UL)}$ denotes a recent uplink throughput of $u_2$.

As above, the scheduling metric may be defined as ratio of a total data rate estimation and a total recent throughput. The total data rate estimation may be given by a sum of a weighted downlink data rate estimation of a DL-MD when pairing with an UL-MD and a weighted uplink data rate estimation of an UL-MD when pairing with a DL-MD. The total recent throughput may be given by a sum of a weighted recent downlink throughput of the DL-MD and a weighted recent uplink throughput of the UL-MD.

Note that the scheduling metrics specifically depend on the data rate estimation of the DL-MD. The DL-MD may thus need to communicate its estimated DL data rate to the BS via various feedback methods that will be described later.

The scheduler may compute the scheduling metric for each identified UL-DL pair, e.g. may search through all possible DL-UL pairs, and may allocate the resource block to the pair having a pre-defined rank in the scheduling metric. This rank may be the highest rank in the scheduling metric. Note that the data rate of DL-MD $u_1$ on RB i depends on which UL-MD it is pairing with and is denoted as $R_{u_1,(UL-MD=u_2)}^{(DL)}(RB_i)$ when pairing with $u_2$ for uplink. The uplink data rate is notated accordingly.

A second case is directed to guarantee fairness across per downlink transmission and per uplink transmission. Downlink and uplink resource for the same mobile device are considered separately. Thus, fairness is considered on per transmit direction basis. The optimization target is to guarantee each downlink transmission and each uplink transmission is allocated resource fairly.

Jointly optimizing both uplink and downlink transmission may be achieved by optimizing the following optimization target with respect to throughput:

$$\sum_u (w_{DL} \cdot f_\alpha(TP_u^{(DL)}) + w_{UL} \cdot f_\alpha(TP_u^{(UL)}))$$

$f_\alpha$ denotes an alpha-fair throughput of user u, wherein user u can be a DL-MD or an UL MD.

$w_{DL}$ denotes a downlink weight indicating a preciousness of downlink resources.

$w_{UL}$ denotes an uplink weight indicating a preciousness of uplink resources.

$TP_u^{(DL)}$ denotes a downlink throughput of user u and $TP_u^{(UL)}$ denotes an uplink throughput of user u.

As above, the optimization target may be defined as a summation over all mobile devices (user) of a sum of a weighted downlink alpha fair throughput of a mobile device (user) and a weighted uplink alpha fair throughput of a mobile device (user).

After solving the optimization problem, the new joint scheduling metric for each UL-DL pair $(u_1,u_2)$ of DL-MD $u_1$ and UL-MD $u_2$ on $RB_i$ may be given by:

$$\frac{w_{DL} \cdot R_{u_1,(UL-UE=u_2)}^{(DL)}(RB_i)}{\left(RTP_{u_1}^{(DL)}\right)^\alpha} + \frac{w_{UL} \cdot R_{u_2,(DL-UE=u_1)}^{(UL)}(RB_i)}{\left(RTP_{u_2}^{(UL)}\right)^\alpha}$$

$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources,
$R_{u_1,(UL-MD=u_2)}^{(DL)}(RB_i)$ denotes a data rate estimation of $u_1$ when pairing with an UL-MD of $u_2$ on $RB_i$,
$R_{u_2,(DL-MD=u_1)}^{(UL)}(RB_i)$ denotes a data rate estimation of a UL-MD $u_2$ when pairing with a DL-MD $u_1$ on $RB_i$,
$RTP_{u_1}^{(DL)}$ denotes a recent downlink throughput of $u_1$, and
$RTP_{u_2}^{(UL)}$ denotes a recent uplink throughput of $u_2$.

As above the scheduling metric may be defined as a sum of a downlink ratio and an uplink ratio for the smallest (minimum) schedulable radio channel resource, e.g. a physical resource block in a time-frequency frame. The downlink ratio may be a ratio of a weighted data rate estimation of a DL-MD when pairing with an UL-MD and a recent downlink throughput of a DL-MD. The uplink ratio may be a ratio of a weighted data rate estimation of an UL-MD when pairing with a DL-MD and a recent uplink throughput of an UL-MD.

Again, the scheduler may search across all potential UL-DL pairs and select the pair with a pre-defined rank in the scheduling metrics. Specifically, the rank may be a highest rank in the scheduling metrics so that the scheduler schedules $RB_i$ to the UL-DL pair with the highest value in the scheduling metrics A joint scheduling metric may be obtained by a linear combination of half-duplex scheduling metrics. The derivation of joint DL-UL scheduling metric for α-fair scheduler when fairness is a guarantee across per DL link and per UL link shows that the joint scheduling metric can be a simple weighted linear combination of traditional half-duplex scheduling metrics, with the traditional half-duplex scheduling metrics adjusted when pairing with a different mobile device in the opposite transmission direction. The simple linear combination rule can be extended to various other types of schedulers. That is, the combined joint DL-UL scheduling metric may be given by:

$$w_{DL}SM_{u_1,(UL-UE=u_2)}^{(DL)}(RB_i) + w_{UL} \cdot SM_{u_2,(DL-UE=u_1)}^{(UL)}(RB_i)$$

$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources, $$SM_{u_1,(UL-MD=u_2)}^{(DL)}(RB_i)$$

denotes an half duplex downlink scheduling metric for DL-MD $u_1$ on RB i when pairing with UL-MD $u_2$ and $$SM_{u_2,(DL-MD=u_1)}^{(UL)}(RB_i)$$

denotes an half duplex uplink scheduling metric of UL-MD $u_2$ on $RB_i$ when pairing with DL-MD $u_1$.

Based on the original scheduling strategy, the scheduler may select the DL-UL pair $(u_1,u_2)$ having a pre-defined rank in the combined scheduling metrics. Specifically the scheduler may select the best DL-UL pair achieving the best joint scheduling metric to be scheduled on $B_i$.

The linear combination strategy may be applied to various channel-aware schedulers. Then, the scheduling metrics for a channel-aware and queue-aware scheduler may be a function of data rate and queue size. The scheduler may obtain the joint DL-UL scheduling metric by computing the DL and UL scheduling metric separately with a data rate adjusted based on the mobile device paired on the opposite transmission direction. Then the scheduler may compute the joint DL-UL scheduling metric as a weighted sum of the two.

A joint scheduling metric may also be obtained by independent DL and UL scheduling metrics. However, the schedulers need to have metrics that are independent of which mobile device a mobile device pairs in the opposite transmission direction. Then, original the scheduler may apply the original scheduling metrics. The scheduler may perform scheduling separately for DL and UL. For example the scheduler may be a Quality of Service (QoS)-aware scheduler that always schedules the packets with longest delay.

A joint DL-UL scheduling metric may depend on the DL data rate estimate of a mobile device when pairing with different mobile devices in UL. Estimation of the data rate may require measurement of the MD-MD interference in a full duplex cellular system 200 as shown in FIG. 2. Specifically, the MD-MD interference may be used to determine to identify any non-pairable mobile devices. The scheduler may thus not schedule radio channel resources to DL-UL pairs that include a DL-MD and a UL-MD that suffers from interference. The interference can be reflected in the scheduling metrics, specifically in the current rate estimation. Alternatively, the interference can be reflected prior to computing the scheduling metrics in the pair identification stage. The pair identification stage may thus exclude non-pairable DL-UL pairs or may not form a DL-UL pair from mobile devices that suffer from interference.

The FD cellular system 200 may be an LTE-compliant system. In the following section, certain aspects of an LTE-compliant system will be presented in LTE terminology. For example, a mobile device may be referred to as user equipment (UE). UE and MD will used interchangeably. This however does not limit any aspects of this disclosure to LTE. CQI (Channel Quality Indication) report is an important element of LTE and has significant impact on the system performance. There are two types of CQI report in LTE: periodic and aperiodic. The periodic CQI report is carried by the PUCCH (Physical Uplink Control Channel). If a UE (user equipment, term for mobile device in LTE) needs to send UL data in the same subframe as the scheduled periodic CQI report, the periodic CQI report will use the PUSCH (Physical Uplink Schared Channel), together with UL data transmission. This is due to the fact that a mobile device cannot transmit on both PUCCH and PUSCH simultaneously. In this case, the periodic PUCCH resource will be idle. Since periodic CQI report brings in the "always on" signaling overhead, the report granularity may be relatively rough. In order to obtain a more detailed CQI report, the base station can trigger an aperiodic CQI report when needed. The aperiodic CQI report is transmitted on PUSCH, together with UL data or alone.

In a conventional LTE system, the granularity of CQI report can be divided into three levels: wideband, UE selected subband, and higher layer configured subband. A subband in LTE is a group of several consecutive physical resource blocks. The wideband report provides one CQI value for the entire downlink system bandwidth. The UE selected subband CQI report divides the system bandwidth into multiple subbands, selects a set of preferred subbands and then reports one CQI value for the wideband and one differential CQI value for the preferred set. The higher layer configured subband report provides the highest granularity. It divides the entire system bandwidth into multiple subbands, then reports one wideband CQI value and multiple differential CQI values, one for each subband.

If closed loop MIMO (Multiple Input Multiple Output) is employed, PMI (Precoding Matrix Indicator) and RI (Rank Indication) are also reported. PMI indicates the codebook (pre-agreed parameters) the base station may use for data transmission over multiple antennas based on the evaluation of received reference signal. RI indicates the number of transmission layers that the UE can distinguish. Spatial multiplexing can be supported only when RI>1. For spatial multiplexing, CQI is reported based on per codeword. The maximum number of codeword in LTE is two.

There are seven transmission modes in conventional LTE, each one is corresponding to certain multiple antenna techniques. For each transmission mode, certain combination of CQI report is defined in the specs, based on periodic/aperiodic, wideband/UE selected subband/higher layer configured subband, No PMI/single PMI/multiple PMI. Since RI changes slower than CQI/PMI, it is reported with a longer interval on periodic report. It is reported together with CQI/PMI on aperiodic report since the resource on PUSCH is less limited.

For a full duplex cellular system employing joint scheduling, feedback strategies for the rank indicator (RI) and precoding matrix indicator (PMI) and CQI reporting are presented in the following paragraphs. The feedback strategies may consider both conventional co-channel interference and interference introduced by FD communications.

Now referring back to FIG. 1, the base-station to base-station interference indicated by arrow 111 that results from downlink transmission of base station 101 may corrupt the reception of the uplink signal of UL-MD 108 as it may dominate the uplink signal due to a larger transmit power of base station 101 compared to UL-MD 108. However, base station to base station interference may be mitigated to a large extent using antenna nulling so that only MD-MD (UE-UE) interference, e.g. as indicated by arrows 112 and 113 for DL-MD 107, remain an issue for identification of pair-able MDs (UEs).

For example, if the inter-cell MD-MD interference (interference between different cells, e.g. cells 102 and 101) at DL-MD 107 resulting from the uplink transmission of UL-MD 106 and/or the intra-cell MD-MD interference (interference within a cell, e.g. cell 104) resulting from the uplink transmission of UL-MD 108 is too high and the scheduler in cellular base station 103 becomes aware of this interference, the scheduler may determine not to schedule DL-MD 107 for DL transmission at all or at least not to pair with UL-MD 108. DL-MD 107 and UL-MD 108 may be non-pairable for full duplex transmission. The interference may be measured at DL-MD 108 and reported to the serving cellular base station 103 by means of different feedback strategies including RI, PMI and CQI and a one bit indication for each interfering other MD whether or not the other MD is an aggressor, i.e. an interferer to an extent making pairing of DL-MD 108 with the other MD impossible, or a two bit indication for each interfering other MD whether the inferring other MD is a strong aggressor or a weak aggressor or a non-aggressor.

For RI report, a mobile device may compute the wideband rank indicator based on overall interference including intra-cell UE-UE interference, inter-cell UE-UE interference and conventional inter-cell BS-UE interference.

$$I_{overall} = I_{intra-ue2ue}(\text{DL-UE,UL-UE}_{sched}) + I_{inter-ue2ue}(\text{DL-UE}) + I_{inter-bs2ue}(\text{DL-UE})$$

In FIG. 1, for DL-UE 107 the intra-cell UE-UE interference includes the interference indicated by arrow 113, the inter-cell UE-UE interference includes the interference indicated by arrow 112 and the conventional inter-cell BS-UE interference includes the interference indicated by arrow 109. The wide-band RI is then feedback to the BS.

For PMI report, a mobile device may compute PMI in the same way as how PMI is computed in a half-duplex system. Each DL-MD may calculate the PMI based on the wide-band RI and the sub-band serving channel information measured from serving cell reference signals. The sub-band PMIs are then fed back to the BS.

Based on RI and PMI information, the MD can compute CQI accordingly. Adapted CQI feedback methods to reflect MD-MD interference level in a FD cellular system may be employed.

Joint Scheduling Strategies

Based on the new joint DL-UL scheduling metric, scheduler at a BS may select the DL-UL pair to be scheduled based on various scheduling strategies. The LTE convention will be used throughout this section. However, aspects of the following paragraphs are not limited to LTE at all. In an LTE-compliant system the minimum scheduling unit per sub-frame is a sub-band and will be referred as such.

Concurrent Joint DL-UL Scheduling

Aspects of joint scheduling strategies may include concurrent Joint DL-UL Scheduling. For every sub-band within current sub-frame, the joint DL-UL scheduler may compute the joint DL-UL scheduling metrics of identified DL-UL pairs according to methods described above. Note that the joint DL-UL scheduler may consider two extreme cases for scheduling: the pure DL transmission cases: (DL UE, no UL), and the pure UL transmission case: (no DL, UL UE). That is, half-duplex transmission with DL and UL UEs scheduled in orthogonal resource blocks are still supported as special cases in full-duplex systems.

The scheduler at a BS may then select the DL-UL pair that achieves a pre-defined rank in the scheduling metrics, specifically the best scheduling metric. Depending on the complexity and performance requirement, the selection procedure may be achieved by either exhaustive search, or optimization algorithms such as Hungarian algorithm for maximum weight matching, greedy algorithm and dynamic programming. After a scheduling decision is being made, the BS can perform rate adaptation and pre-coder selection for DL and UL UEs individually based on the fed-back CQI.

Potential variations for concurrent joint DL-UL scheduling may include excluding DL-only transmission, excluding UL-only transmission, excluding DL-only and UL-only transmission and reducing the plurality of DL-UL pairs to be compared based on additional interference bit map-information fed back by a UE, e.g. a one bitmap information indicating an aggressor or a non-aggressor.

When excluding DL-only transmission the scheduler may only select among all DL-UL pairs and pure UL-MDs. A channel resource will be only scheduled to a DL-UL pair or to a pure UL-MD, but not to a pure DL-MD. In other words, the scheduler may identify a plurality of UL-MDs and jointly optimizing both uplink and downlink transmission of the base station by computing a joint scheduling metric for each DL-UL pair of the plurality of DL-UL pairs and an uplink scheduling metric for each UL-MD of the plurality of UL-MDs to obtain scheduling metrics. The scheduler may then select a DL-UL pair or an UL-MD having a pre-defined rank in the scheduling metrics and subsequently schedule a radio channel resource to the DL-MD and the UL-MD of the DL-UL pair or the UL-MD having the pre-defined rank in the scheduling metrics. The pre-defined rank may be a highest rank.

When excluding UL-only transmission the scheduler may only select among all DL-UL pairs and pure DL-MDs. A channel resource will be only scheduled to a DL-UL pair or to a pure DL-MD, but not to a pure UL-MD. In other words, the scheduler may identify a plurality of DL-MDs and jointly optimizing both uplink and downlink transmission of the base station by computing a joint scheduling metric for each DL-UL pair of the plurality of DL-UL pairs and a downlink scheduling metric for each DL-MD of the plurality of DL-MDs to obtain scheduling metrics. The scheduler may then select a DL-UL pair or a DL-MD having a pre-defined rank in the scheduling metrics and subsequently schedule a radio channel resource to the DL-MD and the UL-MD of the DL-UL pair or the UL-MD having the pre-defined rank in the scheduling metrics. The pre-defined rank may be a highest rank.

When excluding DL-only and UL-only transmission, the scheduler may only select among DL-UL pairs to be scheduled for transmission. In other words, the scheduler may only identify DL-UL pairs, but may not identify any pure DL-MDs or pure UL-MDs.

When reducing a list of identified DL-UL pairs to be compared based on additional interference bit-map information, a bit-map can be feedback by every DL MD to indicate their pair-able UL-MDs. Only the scheduling metrics for pair-able DL-UL pairs will be computed and compared when making the scheduling decision. In other words, the scheduler may discard DL-UL pairs that are not pair-able due to interference when identifying DL-UL pairs based on a bit map that is fed back by each DL-MD indicating its pair-able UL-MDs.

The new joint DL-UL scheduling metrics may be a function of data rate. In typical cellular systems where rapid UL power adjustment may be prohibited, it may be assumed that pairing with different DL-MDs does not affect the UL-MD data rate estimation. On the other hand, the DL-MD data rate may be computed based on RI/PMI/CQI feedback. Different CQI feedback schemes may be employed to enable the BS to estimate the DL-MD SINR (signal to interference and noise ratio) when pairing with different UL-MDs. The DL-MD data rate when pairing with a UL-MD can be derived from SINR estimate.

Figure 4:
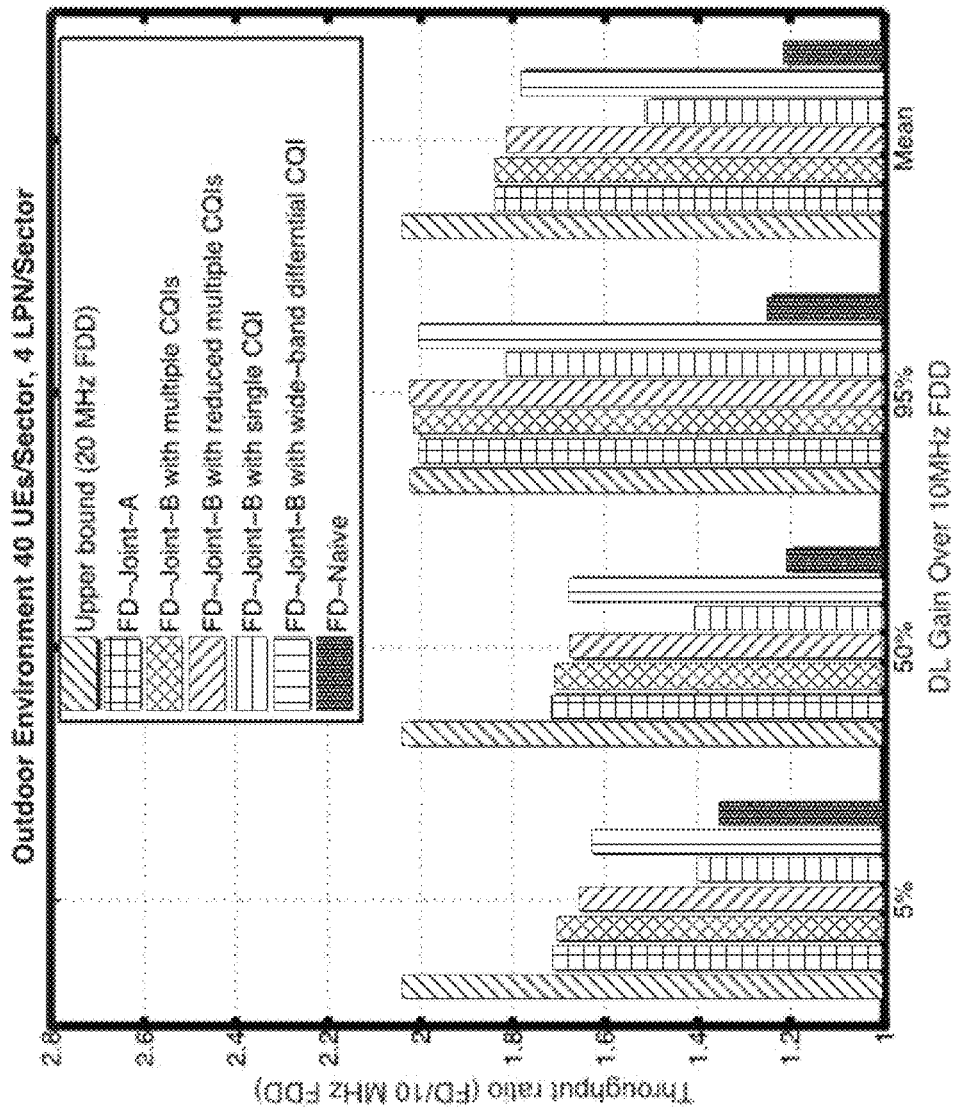
FIG. 4 shows a diagram showing a throughput gain of a FD system over a 10 MHz FDD system in an aspect of this disclosure.

FIG. 4 summarizes the performance of multiple concurrent joint DL-UL scheduling algorithms based on a proportional-fair scheduling metric with DL data rate estimated through different CQI feedback schemes.

Joint-A: The scheduler uses per sub-band per DL-UL pair DL CQI feedback.

Joint-B: The scheduler uses a 1-bit bit-map indicating pair-able DL-UL pairs. The scheduler may further use single CQI, multiple CQI, reduced multiple CQI and wideband differential CQI.

Single CQI refers to a CQI feedback scheme, where for a pair-able DL-UL pair a single per sub-band DL CQI feedback is used for a DL-MD when pairing with different UL-MDs.

Multiple CQI refers to a CQI feedback scheme, where only for pair-able DL-UL pairs a per sub-band per DL-UL pair DL CQI feedback is used. Thus, for each UL-MD the DL-MD may be paired, i.e. for each pair-able DL-UL pair, a CQI is reported. In other words, for DL-MD reporting CQI, there may be as many different CQI values as there are UL-MDs the DL-MD can be paired with.

Reduced multiple CQI refers to a CQI feedback scheme, where with another bit-map distinguishing a non-aggressor UL-MD and a weak-aggressor UL-MD, a single per sub-band DL CQI feedback per DL-MD is reported when pairing with a non-aggressor; and a per sub-band per UL-DL pair DL CQI is reported for a for weak-aggressor.

Wide-band differential CQI refers to a CQI feedback scheme, where a wide-band per DL-UL pair differential DL CQI is reported. The 1-bit bit-map is not required here.

Naïve refers to scheme, where a baseline scheduler with no joint DL-UL scheduling may be employed, just for comparison. Downlink and uplink are scheduled independently.

From FIG. 4 it is clear, that the performance of the joint scheduler depends on the granularity of the CQI feedback scheme employed. The finer the granularity, i.e. the more refined the CQI feedback scheme is, the better the throughput. Specifically, joint A and joint B multiple CQI, joint B reduced multiple CQI and joint B wide-band differential CQI feedback schemes result in a comparable throughput while the single CQI feedback scheme falls behind. Especially for the cell edge MDs, i.e. the 5-percentile MD throughput, the single CQI feedback scheme is comparable to the naïve scheme, where downlink and uplink are scheduled independently. However, for the 95 percentile MD throughput, the single CQI feedback scheme performs much better than the naïve scheme. Hence, there is a substantial gain in throughput by employing joint scheduling metrics in which the scheduler estimates the DL data rate using some CQI feedback compared to a scheme in which the scheduler does not employ a joint scheduling metric but schedules DL and UL independently.

UL-Prioritized Scheduling: Schedule Uplink Mobile Device First

A state-of-the art cellular mobile communications system, such as an LTE system, may require UL scheduling to be determined at least 4 ms before the actual transmission so that there is sufficient time for the UL-MD to decode the UL transmission grant sent by a BS and prepare to transmit in the allocated sub-band of the scheduled sub-frame. For systems with similar requirements, UL scheduling may need to be determined before the DL scheduling decision. Joint DL-UL schedulers are presented that perform UL scheduling first and then select DL-MD based on the UL scheduling decision as UL-prioritized scheduler.

The UL-prioritized scheduler may first loop through each sub-band to schedule UL-MD. The scheduler may schedule the UL-MD with the best scheduling metric. Then, when performing DL scheduling, for each sub-band, a DL-MD may be selected based on the corresponding joint scheduling metric when pairing with the pre-scheduled UL-MD. The joint scheduling metric may be adjusted to reflect the impact of MD-to-MD interference on the DL-MD rate and a potential UL-MD power adjustment for MD-to-MD interference mitigation. The scheduler may schedule the DL-MD with the best adjusted joint scheduling metric.

In other words, the scheduler may identify a plurality of UL-MDs and a plurality of DL-MDs. The scheduler may compute a uplink scheduling metric for each UL-MD of the plurality of UL-MDs to obtain uplink scheduling metrics. The scheduler may select a UL-MD having a pre-defined rank in the UL scheduling metrics. The pre-defined rank in the DL scheduling metrics may be a highest rank. The scheduler may then identify a plurality of downlink-uplink (DL-UL) pairs by pairing the UL-MD having the pre-defined rank in the UL scheduling metrics with each DL-MD of the plurality of DL-MDs. The scheduler may then jointly optimize both uplink and downlink transmission of the base station by computing a joint scheduling metric for each DL-UL pair of the plurality of DL-UL pairs to obtain scheduling metrics. Subsequently, the scheduler may select a DL-UL pair having a pre-defined rank in the scheduling metrics and schedule a radio channel resource to the DL-MD and the UL-MD of the DL-UL pair having the pre-defined rank in the scheduling metrics. The pre-defined rank in the scheduling metrics may be a highest rank.

DL-Prioritized Scheduling: Schedule Downlink Mobile Device First

It is also possible that the scheduler in the base station chooses to prioritize DL transmission and schedule a DL-MD first. In this case, the DL-prioritized scheduler may first loop through each sub-band to schedule a DL-MD. The scheduler may schedule the DL-MD with the best scheduling metric. Then, when the scheduler performs UL scheduling, for each sub-band, an UL-MD may be selected based on the corresponding joint scheduling metric when pairing with the pre-scheduled DL-MD. The joint scheduling metric may be adjusted to reflect the impact of MD-to-MD interference on the DL-MD rate and a potential UL-MD power adjustment for DL-to-DL interference mitigation. The scheduler may schedule the UL-MD with the best adjusted joint scheduling metric.

In other words, the scheduler may identify a plurality of UL-MDs and a plurality of DL-MDs. The scheduler may compute a DL scheduling metric for each DL-MD of the plurality of DL-MDs to obtain downlink scheduling metrics. The scheduler may select a DL-MD having a pre-defined rank in the DL scheduling metrics, specifically a highest rank. The scheduler may then identifying a plurality of DL-UL pairs by pairing the DL-MD having the pre-defined rank in the DL scheduling metrics with each UL-MD of the plurality of UL-MDs. The scheduler may jointly optimize both uplink and downlink transmission of the base station by computing a joint scheduling metric for each DL-UL pair of the plurality of DL-UL pairs to obtain scheduling metrics. The scheduler may then select a DL-UL pair having a pre-defined rank in the scheduling metrics; specifically a highest rank. The scheduler may subsequently schedule radio channel resource to the DL-MD and the UL-MD of the DL-UL pair having the pre-defined rank in the scheduling metrics, specifically of DL-UL pair having the highest rank in the scheduling metrics.

Bundle FD Mobile Devices:

When MDs are with full-duplex capability and have both DL and UL traffic for transmission, the scheduler may choose to bundle UL and DL traffic for a FD-MD to be transmitted simultaneously. One effect of bundle scheduling is that when DL and UL transmission are scheduled for the same FD-MD, there will be no intra-cell MD-to-MD interference. For example, in FD communication network 200 depicted in FIG. 2, FD-MDs 206 and 207 do not experience any intra-cell MD-to-MD interference, when they both are scheduled for DL as well as UL transmission. Hence, the scheduler may not pair FD-MDs with other MDs in order to mitigate intra-cell MD-to-MD interference.

When all MDs are full-duplex MDs with bi-directional of traffic, the bundle FD scheduler may thus allocates DL and UL transmission of one scheduling unit to the same FD-MD. The bundle FD scheduler may not consider the DL-UL pairs from two different FD-MDs to be scheduled in DL and UL direction. Therefore, there is no need to measure any wide-band per UL-DL pair feedback or sub-band per pair CQI feedback for FD-MDs. Signaling overhead to perform joint scheduling may be reduced for FD-MDs and a conventional CQI feedback scheme may be used to schedule FD-MDs.

In other words, when identifying a plurality of downlink-uplink (DL-UL) pairs, the scheduler may identify a FD-MD configured for simultaneous downlink transmission and uplink transmission representing a DL-MD and an UL-MD of a DL-UL pair.

When there are MDs with only half-duplex capability or with only one direction of traffic, joint DL-UL scheduling methods as previously disclosed may be used together with the bundle FD scheduler. All possible DL-UL pairs of HD MDs can be potential candidates to be scheduled. The pair-able DL-UL MD list can be determined based on methods described previously. In addition, the bundle FD scheduler precludes the DL-UL pairs from two different FD MDs to be scheduled in DL and UL direction. There can be two variations of bundle FD schedulers regarding whether pairing between FD MDs and HD MDs is allowed.

Variation 1: FD MDs cannot be paired with HD MDs. For this case, FD MDs can only be scheduled with simultaneous DL and UL transmission. Since there is no intra-cell MD-to-MD interference during FD MD transmission, FD MDs may use a conventional CQI feedback mechanism. The bundle scheduler may select to schedule the DL-UL pair with the best scheduling metric from all HD MDs and all FD DL-UL pairs of FD MDs, where the DL-UL pairs must be the same FD MD.

In other words, at least some of the DL-UL pairs of the plurality of DL-UL pairs include a full duplex mobile device (FD-MD) configured for simultaneous downlink transmission and uplink transmission. Each FD-MD is configured to employ channel quality indicator (CQI) feedback disregarding intra-cell MD-to-MD interference.

Variation 2: FD MDs can be paired with HD MDs. For this case, interference from FD-MD to DL-MD and interference from UL-MD to FD-MD may need to be measured and reported using the CQI feedback schemes referred to above. The bundle scheduler may select to schedule the DL-UL pair with the best scheduling metric from all possible DL-UL pairs of HD MDs, all possible DL-UL pairs of HD DL-MDs and FD UL-MDs, all possible DL-UL pairs of FD DL MDs and HD UL-MDs, and all FD DL-UL pairs of FD MDs where the DL-UL MDs are the same FD MD.

In other words, at least some of the DL-UL pairs of the plurality of DL-UL pairs include a FD-MD configured for either downlink transmission or uplink transmission and a half duplex mobile device (HD-MD) configured for the opposite transmission direction as the FD-MD. The scheduler may estimate a downlink data rate based on rank indicator (RI) and precoding matrix indicator (PMI) information that is fed back by a mobile device (MD) to the base station (BS), wherein the RI is a wide-band rank indicator based on overall interference including intra-cell MD-MD interference, inter-cell MD-MD interference and inter-cell BS-MD interference and wherein the PMI is based on the wide-bank rank indicator and on sub-band serving channel information measured from serving cell reference signals. Note that the DL-only transmission and UL-only transmission can still be considered for scheduling for HD MDs.

Figure 5B:
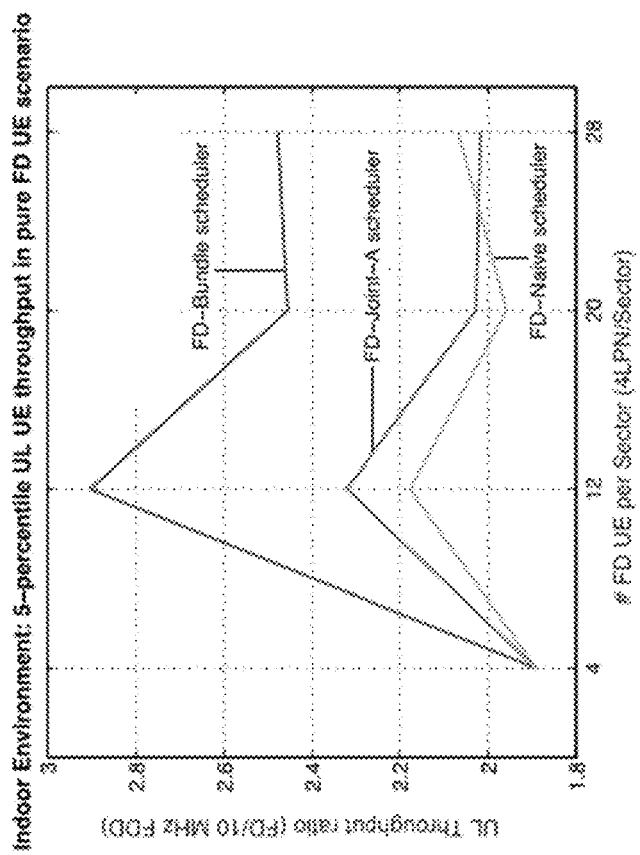
FIG. 5B shows an uplink throughput gain of a FD system over 10 MHz FDD system for cell edge mobile devices (5-percentile mobile device throughput)
Figure 5A:
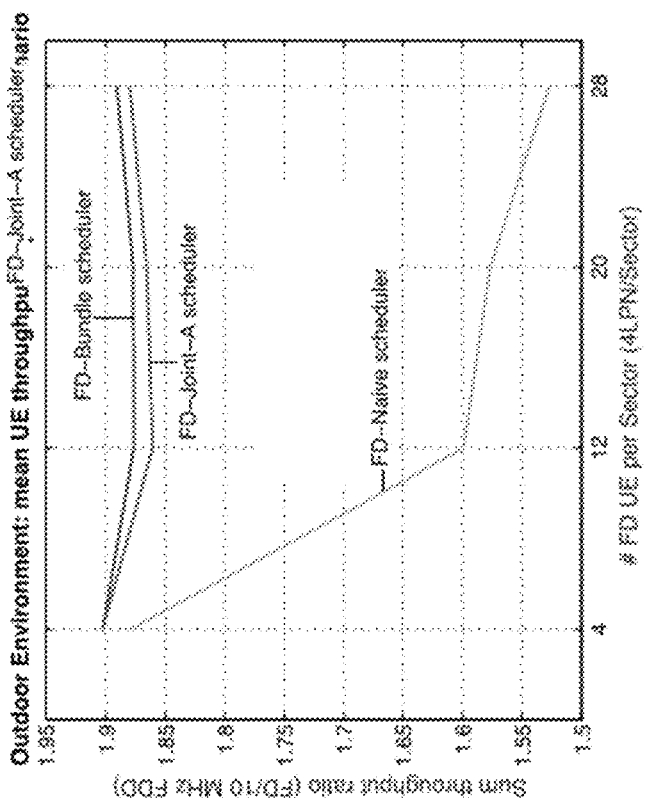
FIG. 5A shows a throughput gain of a FD system over a 10 MHz FDD system versus a number of FD mobile devices per sector in an aspect of this disclosure.
Figure 6B:
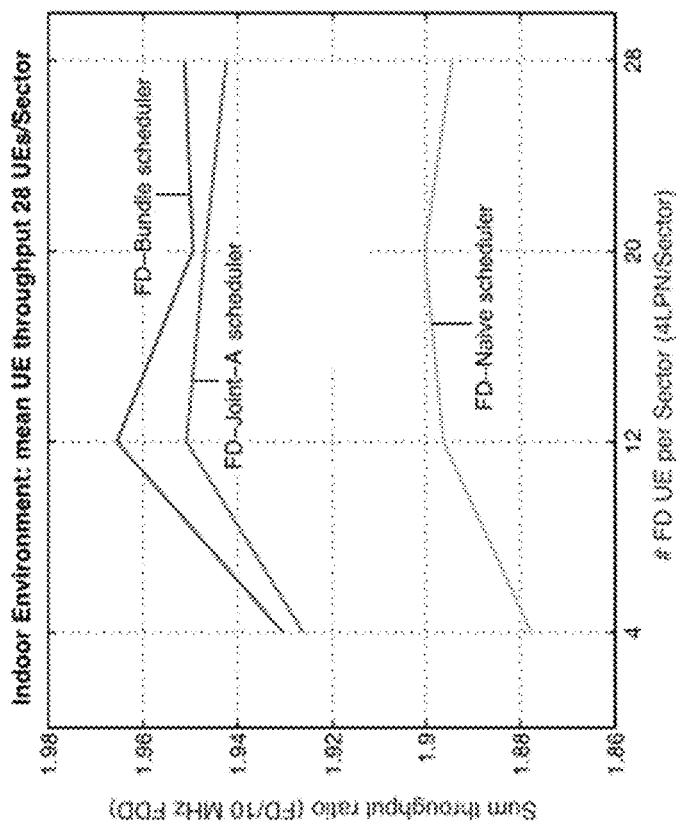
FIG. 6B shows a throughput gain of a FD system over a 10 MHz FDD system versus a number of FD mobile devices per sector for indoor environment in an aspect of this disclosure.
Figure 6A:
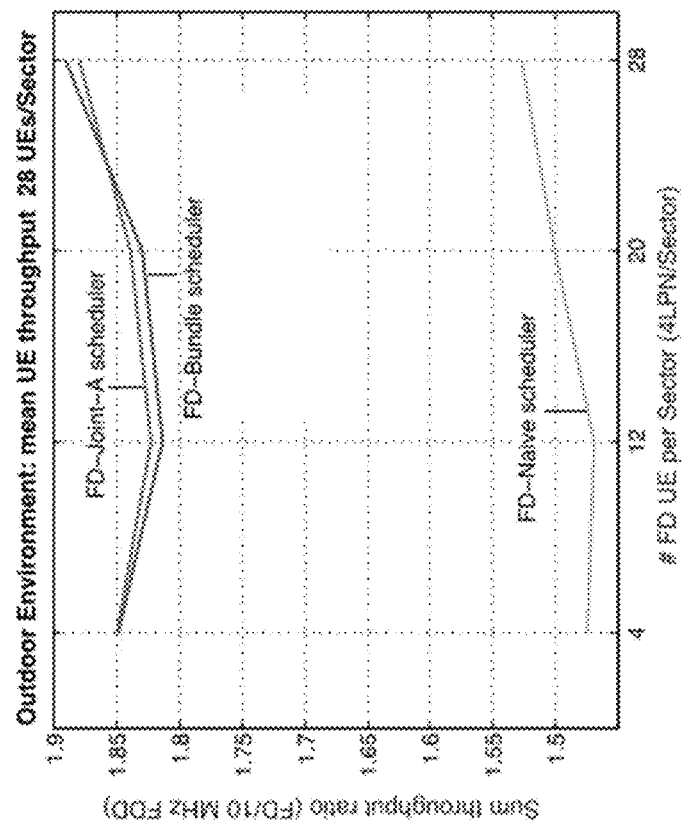
FIG. 6A shows a throughput gain of a FD system over a 10 MHz FDD system versus a number of FD mobile devices per sector for an outdoor environment in an aspect of this disclosure.

FIG. 5 and FIG. 6 show the performance of bundle scheduler in various scenarios in a fully standardized LTE small cell system level simulator. In FIG. 5, the mean throughputs of downlink and uplink are depicted for a bundle scheduler, a joint scheduler and a naïve scheduler in a pure FD MD scenario. The x-axis represents the number of FD MDs in each sector. The y-axis represents the throughput gain over a 10 MHz FDD system (20M spectrum in total). It can be observed that the bundle scheduler performs close to the joint scheduler and outperforms the naïve scheduler. Moreover, in indoor environment, the bundle scheduler can significantly improve uplink throughput for cell-edge UEs, i.e. the 5-percentile MD throughput, which is more than 2.8× throughput gain as compared with half-duplex system.

FIG. 6 demonstrates the performance of the bundle scheduler in a mixed FD and HD MD scenario. The x-axis represents the number of FD MDs in each sector. The y-axis represents the throughput gain over a 10 MHz FDD system (20M spectrum in total). In the mixed FD and HD MD scenario, the bundle scheduler is used for FD MDs and joint scheduler is used for the remaining HD MDs.

For both indoor and outdoor environments, it can be observed that by prioritizing FD MDs with the bundle scheduler, the system throughput does not suffer from any performance degradation when compared with the joint scheduler which performs exhaustive search of the best pair of UL-DL MDs.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

Example 1 includes a method for operating a base station (BS) in a full duplex (FD) cellular system, the method comprising:
identifying a plurality of downlink-uplink (DL-UL) pairs, wherein each DL-UL pair comprises a mobile device configured for downlink transmission (DL-MD) of a plurality of downlink mobile devices DL-MDs and a mobile device configured for uplink transmission (UL-MD) of a plurality of uplink mobile devices UL-MDs;

jointly optimizing both uplink and downlink transmission of the base station by computing a joint scheduling metric for each DL-UL pair of the plurality of DL-UL pairs to obtain scheduling metrics;
selecting an DL-UL pair based on a pre-defined rank in the scheduling metrics; and
scheduling a radio channel resource to the DL-MD and the UL-MD of the DL-UL pair having the pre-defined rank in the scheduling metrics.

Example 2 includes the method of example 1, wherein the pre-defined rank in the scheduling metrics is a highest rank in the scheduling metrics.

Example 3 includes the method of any of examples 1 to 2, wherein jointly optimizing both uplink and downlink transmission comprises employing a guarantee fairness scheduler.

Example 4 includes the method of any of examples 1 to 3, wherein jointly optimizing both uplink and downlink transmission comprises employing an alpha-fair scheduler with fairness parameter $\alpha$.

Example 5 includes the method of example 4, wherein jointly optimizing both uplink and downlink transmission comprises optimizing the following optimization target $\Sigma_u f_\alpha (w_{DL} \cdot TP_u^{(DL)} + w_{UL} \cdot TP_u^{(UL)})$ with respect to throughput, wherein
$f_\alpha$ denotes an alpha-fair throughput of user u, wherein user u can be a DL-MD or an UL-MD.
$w_{DL}$ denotes a downlink weight indicating a preciousness of downlink resources,
$w_{UL}$ denotes an uplink weight indicating a preciousness of uplink resources,
$TP_u^{(DL)}$ denotes a downlink throughput of user u and $TP_u^{(UL)}$ denotes an uplink throughput of user u.

Example 6 includes the method of example 5, wherein computing a joint scheduling metric for each UL-DL pair $(u_1, u_2)$ of DL-MD $u_1$ and UL-MD $u_2$ of the plurality of UL-DL pairs comprises computing:

$$\frac{w_{DL} \cdot R_{u_1,(UL-MD=u_2)}^{(DL)}(RB_i) + w_{UL} \cdot R_{u_2,(DL-MD=u_1)}^{(UL)}(RB_i)}{\left(w_{DL} \cdot RTP_{u_1}^{(DL)} + w_{UL} \cdot RTP_{u_2}^{(UL)}\right)^\alpha},$$

wherein
$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources,
$R_{u_1,(UL-MD=u_2)}^{(DL)}(RB_i)$ denotes a data rate estimation of DL-MD $u_1$ when pairing with UL-MD $u_2$ on $RB_i$,
$R_{u_2,(DL-MD=u_1)}^{(UL)}(RB_i)$ denotes a data rate estimation of UL-MD $u_2$ when pairing with DL-MD $u_1$ on $RB_i$,
$RTP_{u_1}^{(DL)}$ denotes a recent downlink throughput of DL-MD $u_1$, and
$RTP_{u_2}^{(UL)}$ denotes a recent uplink throughput of UL-MD $u_2$.

Example 7 includes the method of any of examples 1 to 4, wherein jointly optimizing both uplink and downlink transmission comprises optimizing the following optimization target
$\Sigma_u(w_{DL} \cdot f_\alpha(TP_u^{(DL)}) + w_{UL} \cdot f_\alpha(TP_u^{(UL)}))$ with respect to throughput, wherein
$f_\alpha$ denotes an alpha-fair throughput of mobile device u, wherein the mobile device u is a DL-MD or an UL-MD,
$w_{DL}$ denotes a downlink weight indicating a preciousness of downlink resources, $w_{UL}$ denotes an uplink weight indicating a preciousness of uplink resources,
$TP_u^{(DL)}$ denotes a downlink throughput of user u and $TP_u^{(UL)}$ denotes an uplink throughput of user u.

Example 8 includes the method of example 7, wherein computing a joint scheduling metric for each UL-DL pair $(u_1,u_2)$ comprising DL-MD and UL-MD $u_2$ of the plurality of UL-DL pairs comprises computing:

$$\frac{w_{DL} \cdot R_{u_1,(UL-MD=u_2)}^{(DL)}(RB_i)}{(RTP_{u_1}^{(DL)})^\alpha} + \frac{w_{UL} \cdot R_{u_2,(DL-MD=u_1)}^{(UL)}(RB_i)}{(RTP_{u_2}^{(UL)})^\alpha},$$

wherein
$RB_i$ denotes an i-th resource block of the radio channel resource to be scheduled,
$w_{DL}$ denotes a downlink weight indicating a preciousness of downlink resources,
$w_{UL}$ denotes an uplink weight indicating a preciousness of uplink resources,
$R_{u_1,(UL-MD=u_2)}^{(DL)}(RB_i)$ denotes a data rate estimation of DL-MD $u_1$ when pairing with UL-MD $u_2$ on $RB_i$,
$R_{u_2,(DL-MD=u_1)}^{(UL)}(RB_i)$ denotes a data rate estimation of UL-MD $u_2$ when pairing with DL-MD $u_2$ on $RB_i$,
$RTP_{u_1}^{(DL)}$ denotes a recent downlink throughput of DL-MD $u_1$, and
$RTP_{u_2}^{(UL)}$ denotes a recent uplink throughput of UL-MD $u_2$.

Example 9 includes the method of any of examples 4 to 8, wherein the alpha-fair scheduler optimizes the following optimization target:

$\Sigma_u f_\alpha(TP_u)$;

wherein $TP_u$ denote the throughput of user u; and wherein an alpha-throughput is defined as:

$$(TP_u) = \begin{cases} (TP_u)^{1-\alpha}/(1-\alpha), & \text{for } \alpha \neq 1; \\ \log(TP_u), & \text{for } \alpha = 1 \end{cases}.$$

Example 10 includes the method of any of examples 4 to 9, wherein α equals one.

Example 11 includes the method of any of examples 4 to 9, wherein α equals zero.

Example 12 includes the method of any of examples 4 to 9, wherein α equals infinity.

Example 13 includes the method of example 1, wherein computing a joint scheduling metric for each DL-UL pair of the plurality of DL-UL pairs comprises computing a linear combination of half-duplex scheduling metrics.

Example 14 includes the method of example 13 further comprising: adjusting the half-duplex scheduling metrics when pairing a MD with another MD in an opposite transmission direction.

Example 15 includes the method of example 13 further comprising: adjusting the half-duplex scheduling metrics when pairing an UL transmission with a DL transmission of a full duplex mobile device.

Example 16 includes the method of any of examples 13 to 15, wherein computing a joint scheduling metric for each UL-DL pair $(u_1,u_2)$ of DL-MD $u_1$ and UL-MD $u_2$ of the plurality of UL-DL pairs comprises computing $$w_{DL} SM_{u_1,(UL-MD=u_2)}^{(DL)}(RB_i) + w_{UL} \cdot SM_{u_2,(DL-MD=u_1)}^{(UL)}(RB_i),$$

wherein
$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources, $$SM_{u_1,(UL-MD=u_2)}^{(DL)}(RB_i)$$

denotes an half duplex downlink scheduling metric for DL-MD $u_1$ on $RB_i$ when pairing with UL-MD $u_2$ and $$SM_{u_2,(DL-MD=u_1)}^{(UL)}(RB_i)$$

denotes an half duplex uplink scheduling metric of UL-MD $u_2$ on $RB_i$ when pairing with DL-MD $u_1$.

Example 17 includes the method of any of examples 13 to 16, wherein the half-duplex scheduling metrics comprise scheduling metrics for a channel-aware and queue-aware scheduler, wherein the scheduling metrics are dependent on data rate and queue size of a data queue.

Example 18 includes the method of any of examples 16 to 17, wherein computing a linear combination of half-duplex scheduling metrics comprises computing a downlink half duplex scheduling metric and an uplink half duplex scheduling metric separately with a data rate adjusted based on the MD paired on an opposite transmission direction.

Example 19 includes the method of example 1, wherein computing a joint scheduling metric for each DL-UL pair of the plurality of DL-UL pairs comprises computing a half-duplex downlink scheduling metric and a half-duplex uplink scheduling metric and wherein
selecting an DL-UL pair having a pre-defined rank in the joint scheduling metrics comprises
selecting a DL-MD having the pre-defined rank in the half-duplex downlink scheduling metric and selecting an UL-MD having the pre-defined rank in the half-duplex uplink scheduling metric, wherein the DL-UL pair comprises the selected DL-MD and the selected UL-MD.

Example 20 includes the method of example 19, wherein the pre-defined rank in the half-duplex downlink scheduling metric is a highest rank in the half-duplex downlink scheduling metric and wherein the pre-defined rank in the half-duplex uplink scheduling metric is a highest rank in the half-duplex uplink scheduling metric.

Example 21 includes the method of example 20, wherein the half-duplex downlink scheduling metric and the half-duplex uplink scheduling metric comprise a scheduling metric for a quality of service aware scheduler that schedules packets with a longest delay.

Example 22 includes the method of example 1, computing a joint scheduling metric for each DL-UL pair of the plurality of DL-UL pairs comprises estimating a downlink data rate based on rank indicator (RI) and precoding matrix indicator (PMI) information that is fed back by a mobile device (MD) to the base station (BS).

Example 23 includes the method of example 22, wherein the RI comprises a wide-band rank indicator based on overall interference including intra-cell MD-MD interference, inter-cell MD-MD interference and inter-cell BS-MD interference.

Example 24 includes the method of example 23, wherein the PMI is based on the wide-bank rank indicator and on sub-band serving channel information measured from serving cell reference signals.

Example 25 includes the method of example 1 further comprising:
identifying a plurality of UL-MDs;
jointly optimizing both uplink and downlink transmission of the base station by computing a joint scheduling metric for each DL-UL pair of the plurality of DL-UL pairs and an uplink scheduling metric for each UL-MD of the plurality of UL-MDs to obtain scheduling metrics;
selecting an DL-UL pair or an UL-MD having a pre-defined rank in the scheduling metrics; and
scheduling a radio channel resource to the DL-MD and the UL-MD of the DL-UL pair or the UL-MD having the pre-defined rank in the scheduling metrics.

Example 26 includes the method of example 1 further comprising:
identifying a plurality of DL-MDs;
jointly optimizing both uplink and downlink transmission of the base station by computing a joint scheduling metric for each DL-UL pair of the plurality of DL-UL pairs and a downlink scheduling metric for each DL-MD of the plurality of DL-MDs to obtain scheduling metrics;
selecting an DL-UL pair or a DL-MD having a pre-defined rank in the scheduling metrics; and
scheduling a radio channel resource to the DL-MD and the UL-MD of the DL-UL pair or the DL-MD having the pre-defined rank in the scheduling metrics.

Example 27 includes the method of example 1, wherein identifying a plurality of downlink-uplink (DL-UL) pairs comprises discarding DL-UL pairs that are not pair-able due to interference.

Example 28 includes the method of example 27, the method further comprising:
feeding back a bit-map by each DL-MD of the plurality of DL-MDs indicating its pair-able UL-MDs.

Example 29 includes the method of example 28, wherein the bit-map of each DL-MD indicates strong interfering UL-MDs, weak interfering UL-MDs and non-interfering DL-MDs.

Example 30 includes the method of any of examples 25 to 29, wherein the pre-defined rank is a highest rank in the scheduling metrics.

Example 31 includes the method of example 1, wherein the method comprises:
identifying a plurality of mobile devices configured for uplink transmission (UL-MDs);
identifying a plurality of mobile devices configured for downlink transmission (DL-MDs);
computing an uplink (UL) scheduling metric for each UL-MD of the plurality of UL-MDs to obtain (UL) scheduling metrics;
selecting an UL-MD having a pre-defined rank in the UL scheduling metrics;
identifying a plurality of downlink-uplink (DL-UL) pairs by pairing the UL-MD having the pre-defined rank in the UL scheduling metrics with each DL-MD of the plurality of DL-MDs;
jointly optimizing both uplink and downlink transmission of the base station by computing a joint scheduling metric for each DL-UL pair of the plurality of DL-UL pairs to obtain joint scheduling metrics; and
selecting an DL-UL pair having a pre-defined rank in the scheduling metrics; and scheduling a radio channel resource to the DL-MD and the UL-MD of the DL-UL pair having the pre-defined rank in the scheduling metrics.

Example 32 includes the method of example 31, wherein the pre-defined rank in the UL scheduling metrics is a highest rank in the UL scheduling metrics and wherein the pre-defined rank in the scheduling metrics is a highest rank in the scheduling metrics.

Example 33 includes the method of example 1, wherein the method comprises:
identifying a plurality of mobile devices configured for uplink transmission (UL-MDs);
identifying a plurality of mobile devices configured for downlink transmission (DL-MDs);
computing a downlink (DL) scheduling metric for each DL-MD of the plurality of DL-MDs to obtain downlink scheduling metrics;
selecting a DL-MD having a pre-defined rank in the DL scheduling metrics;
identifying a plurality of downlink-uplink (DL-UL) pairs by pairing the DL-MD having the pre-defined rank in the DL scheduling metrics with each UL-MD of the plurality of UL-MDs;
jointly optimizing both uplink and downlink transmission of the base station by computing a joint scheduling metric for each DL-UL pair of the plurality of DL-UL pairs to obtain scheduling metrics; and
selecting an DL-UL pair having a pre-defined rank in the scheduling metrics; and scheduling a radio channel resource to the DL-MD and the UL-MD of the DL-UL pair having the pre-defined rank in the scheduling metrics.

Example 34 includes the method of example 33, wherein the pre-defined rank in the DL scheduling metric is a highest rank in the DL scheduling metrics and wherein the pre-defined in the scheduling metrics is a highest rank in the scheduling metrics.

Example 35 includes the method of any of examples 31 to 32, wherein the joint scheduling metric is adjusted to reflect an impact of MD-to-MD interference on a DL-MD rate and to a potential UL-MD power adaption to mitigate MD-to-MD interference.

Example 36 includes the method of any of examples 1 to 34, wherein identifying a plurality of downlink-uplink (DL-UL) pairs comprises identifying a full duplex mobile device configured for simultaneous downlink transmission and uplink transmission representing a DL-MD and an UL-MD.

Example 37 includes the method of example 36, wherein each DL-UL pair of the plurality of DL-UL pairs is a full duplex mobile device (FD-MD) configured for simultaneous downlink transmission and uplink transmission.

Example 38 includes the method of example 37, wherein each FD-MD is configured to employ channel quality indicator (CQI) feedback disregarding intra-cell MD-to-MD interference.

Example 39 includes the method of any of examples 1 to 34, wherein at least some of the DL-UL pairs of the plurality of DL-UL pairs are a full duplex mobile device (FD-MD) configured for simultaneous downlink transmission and uplink transmission.

Example 40 includes the method of example 39, wherein computing a joint scheduling metric for each DL-UL pair of the plurality of DL-UL pairs comprises estimating a downlink data rate based on rank indicator (RI) and precoding matrix indicator (PMI) information that is fed back by a mobile device (MD) to the base station (BS), wherein the RI is a wide-band rank indicator based on overall interference including intra-cell MD-MD interference, inter-cell MD-MD interference and inter-cell BS-MD interference and wherein the PMI is based on the wide-bank rank indicator and on sub-band serving channel information measured from serving cell reference signals.

Example 41 includes a base station (BS) comprising:
a radio transceiver configured to provide a full-duplex air interface to mobile devices (MDs);
a scheduler interfaced to the radio transceiver, wherein the scheduler is configured to:
identify a plurality of downlink-uplink (DL-UL) pairs, wherein each DL-UL pair comprises a mobile device configured for downlink transmission (DL-MD) of a plurality of downlink mobile devices (DL-MDs and a mobile device configured for uplink transmission (UL-MD) of a plurality of uplink mobile devices (UL-MDs);
jointly optimize both uplink and downlink transmission of the base station by computing a joint scheduling metric for each DL-UL pair of the plurality of DL-UL pairs to obtain scheduling metrics;
select an DL-UL pair based on a pre-defined rank in the scheduling metrics; and schedule a radio channel resource to the DL-MD and the UL-MD of the DL-UL pair having the pre-defined rank in the scheduling metrics.

Example 42 includes the base station of example 41, wherein the pre-defined rank in the scheduling metrics is a highest rank in the scheduling metrics.

Example 43 includes the base station of any of examples 41 to 42, wherein the scheduler is configured as guarantee fairness scheduler.

Example 44 includes the base station of any of examples 41 to 43, wherein the scheduler is configured as an alpha-fair scheduler with fairness parameter $\alpha$.

Example 45 includes the base station of example 44, wherein the scheduler is configured to optimize the following optimization target
$\Sigma_u f_\alpha(w_{DL} \cdot TP_u^{(DL)} + w_{UL} \cdot TP_u^{(UL)})$ with respect to throughput, wherein
$f_\alpha$ denotes an alpha-fair throughput of user u, wherein user u can be a DL-MD or an UL MD,
$w_{DL}$ denotes a downlink weight indicating a preciousness of downlink resources,
$w_{UL}$ denotes an uplink weight indicating a preciousness of uplink resources,
$TP_u^{(DL)}$ denotes a downlink throughput of user u and $TP_u^{(UL)}$ denotes an uplink throughput of user u.

Example 46 includes the base station of example 45, wherein the scheduler is configured to compute a joint scheduling metric for each UL-DL pair $(u_1, u_2)$ of users $u_1$ and $u_2$ of the plurality of UL-DL pairs by computing:

$$\frac{w_{DL} \cdot R^{(DL)}_{u_1,(UL-UE=u_2)}(RB_i) + w_{UL} \cdot R^{(UL)}_{u_2,(DL-UE=u_1)}(RB_i)}{(w_{DL} \cdot RTP^{(DL)}_{u_1} + w_{UL} \cdot RTP^{(UL)}_{u_2})^\alpha},$$

wherein
$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources,
$R^{(DL)}_{u_1,(UL-UE=u_2)}(RB_i)$ denotes a data rate estimation of a DL-MD of user $u_1$ when pairing with an UL-MD of user $u_2$ on $RB_i$,
$R^{(UL)}_{u_2,(DL-UE=u_1)}(RB_i)$ denotes a data rate estimation of a UL-MD of user $u_2$ when pairing with a DL-MD of user $u_2$ on $RB_i$,
$RTP_{u_1}^{(DL)}$ denotes a recent downlink throughput of user $u_1$, and
$RTP_{u_2}^{(UL)}$ denotes a recent uplink throughput of user $u_2$.

Example 47 includes the base station of any of examples 41 to 44, wherein the scheduler is configured to jointly optimize both uplink and downlink transmission by optimizing the following optimization target
$\Sigma_u (w_{DL} \cdot f_\alpha(TP_u^{(DL)}) + w_{UL} \cdot f_\alpha(TP_u^{(UL)}))$ with respect to throughput, wherein
$f_\alpha$ denotes an alpha-fair throughput of user u, wherein user u can be a DL-MD or an UL MD,
$w_{DL}$ denotes a downlink weight indicating a preciousness of downlink resources,
$w_{UL}$ denotes an uplink weight indicating a preciousness of uplink resources,
$TP_u^{(DL)}$ denotes a downlink throughput of user u and $TP_u^{(UL)}$ denotes an uplink throughput of user u.

Example 48 includes the base station of example 47, wherein the scheduler is configured to compute a joint scheduling metric for each UL-DL pair $(u_1, u_2)$ of users $u_1$ and $u_2$ of the plurality of UL-DL pairs by computing:

$$\frac{w_{DL} \cdot R^{(DL)}_{u_1,(UL-UE=u_2)}(RB_i)}{(RTP^{(DL)}_{u_1})^\alpha} + \frac{w_{UL} \cdot R^{(UL)}_{u_2,(DL-UE=u_1)}(RB_i)}{(RTP^{(UL)}_{u_2})^\alpha},$$

wherein
$RB_i$ denotes an i-th resource block of the radio channel resource to be scheduled,
$w_{DL}$ denotes a downlink weight indicating a preciousness of downlink resources,
$w_{UL}$ denotes an uplink weight indicating a preciousness of uplink resources,
$R^{(DL)}_{u_1,(UL-UE=u_2)}(RB_i)$ denotes a data rate estimation of a DL-MD of user $u_1$ when pairing with an UL-MD of user $u_2$ on $RB_i$,
$R^{(UL)}_{u_2,(DL-UE=u_1)}(RB_i)$ denotes a data rate estimation of a UL-MD of user $u_2$ when pairing with a DL-MD of user $u_2$ on $RB_i$,
$RTP_{u_1}^{(DL)}$ denotes a recent downlink throughput of user $u_1$, and
$RTP_{u_2}^{(UL)}$ denotes a recent uplink throughput of user $u_2$.

Example 49 includes the base station of any of examples 44 to 48, wherein the alpha-fair scheduler optimizes the following optimization target:

$\Sigma_u f_\alpha(TP_u);$ wherein $TP_u$ denote the throughput of user u; and wherein an alpha-throughput is defined as:

$$(TP_u) = \begin{cases} (TP_u)^{1-\alpha}/(1-\alpha), & \text{for } \alpha \neq 1; \\ \log(TP_u), & \text{for } \alpha = 1 \end{cases}.$$

Example 50 includes the base station of any of examples 44 to 49, wherein $\alpha$ equals one.

Example 51 includes the base station of any of examples 44 to 49, wherein $\alpha$ equals zero.

Example 52 includes the base station of any of examples 44 to 49, wherein $\alpha$ equals infinity.

Example 53 includes the base station of example 41, wherein the scheduler is configured to compute a joint scheduling metric for each DL-UL pair of the plurality of DL-UL pairs comprises computing a linear combination of half-duplex scheduling metrics.

Example 54 includes the base station of example 53, wherein the scheduler is configured to adjust the half-duplex scheduling metrics when pairing a MD with another MD in an opposite transmission direction.

Example 55 includes the base station of example 53 further comprising: adjusting the half-duplex scheduling metrics when pairing an UL transmission with a DL transmission of a full duplex mobile device.

Example 56 includes the base station of any of examples 53 to 55, wherein the scheduler is configured to compute a joint scheduling metric for each UL-DL pair $(u_1,u_2)$ of users $u_1$ and $u_2$ of the plurality of UL-DL pairs comprises computing $$w_{DL}SM^{(DL)}_{u_1,(UL-UE=u_2)}(RB_i) + w_{UL} \cdot SM^{(UL)}_{u_2,(DL-UE=u_1)}(RB_i),$$

wherein
$RB_i$ denotes an i-th resource block of a channel resource to be scheduled,
$w_{DL}$ denotes a downlink weight indicating a preciousness of downlink resources,
$w_{UL}$ denotes an uplink weight indicating a preciousness of uplink resources, $$SM^{(DL)}_{u_1,(UL-UE=u_2)}(RB_i)$$

denotes an half duplex downlink scheduling metric for DL-MD of user $u_1$ on RB i when pairing with UL-MD of user $u_2$ and $$SM^{(UL)}_{u_2,(DL-UE=u_1)}(RB_i)$$

denotes an half duplex uplink scheduling metric for UL-MD of user $u_2$ on RB i when pairing with DL-MD of user $u_1$.

Example 57 includes the base station of any of examples 53 to 56, wherein the half-duplex scheduling metrics comprise scheduling metrics for a channel-aware and queue-aware scheduler, wherein the scheduling metrics are dependent on data rate and queue size of a data queue.

Example 58 includes the base station of any of examples 56 to 57, wherein the scheduler is configured to compute a linear combination of half-duplex scheduling metrics by computing a downlink half duplex scheduling metric and an uplink half duplex scheduling metric separately with a data rate adjusted based on the MD paired on an opposite transmission direction.

Example 59 includes the base station of example 41, wherein the scheduler is configured to compute a joint scheduling metric for each DL-UL pair of the plurality of DL-UL pairs by computing a half-duplex downlink scheduling metric and a half-duplex uplink scheduling metric and wherein
the scheduler is configured to select an DL-UL pair having a pre-defined rank in the joint scheduling metrics by selecting a DL-MD having the pre-defined rank in the half-duplex downlink scheduling metric and selecting an UL-MD having the pre-defined rank in the half-duplex uplink scheduling metric, wherein the DL-UL pair comprises the selected DL-MD and the selected UL-MD.

Example 60 includes the base station of example 59, wherein the pre-defined rank in the half-duplex downlink scheduling metric is a highest rank in the half-duplex downlink scheduling metric and wherein the pre-defined rank in the half-duplex uplink scheduling metric is a highest rank in the half-duplex uplink scheduling metric.

Example 61 includes the base station of example 60, wherein the half-duplex downlink scheduling metric and the half-duplex uplink scheduling metric comprise a scheduling metric for a quality of service aware scheduler that schedules packets with a longest delay.

Example 62 includes the base station of example 61, wherein the scheduler is configured to compute a joint scheduling metric for each DL-UL pair of the plurality of DL-UL pairs by estimating a downlink data rate based on rank indicator (RI) and precoding matrix indicator (PMI) information that is fed back by a mobile device (MD) to the base station (BS).

Example 63 includes the base station of example 62, wherein the RI comprises a wide-band rank indicator based on overall interference including intra-cell MD-MD interference, inter-cell MD-MD interference and inter-cell BS-MD interference.

Example 64 includes the base station of example 63, wherein the PMI is based on the wide-bank rank indicator and on sub-band serving channel information measured from serving cell reference signals.

Example 65 includes the base station of example 41, wherein the scheduler is further configured to:
identify a plurality of UL-MDs;
jointly optimize both uplink and downlink transmission of the base station by computing a joint scheduling metric for each DL-UL pair of the plurality of DL-UL pairs and an uplink scheduling metric for each UL-MD of the plurality of UL-MDs to obtain scheduling metrics;
select an DL-UL pair or an UL-MD having a pre-defined rank in the scheduling metrics; and
schedule a radio channel resource to the DL-MD and the UL-MD of the DL-UL pair or the UL-MD having the pre-defined rank in the scheduling metrics.

Example 66 includes the base station of example 41, wherein the scheduler is further configured to:
identify a plurality of DL-MDs;
jointly optimize both uplink and downlink transmission of the base station by computing a joint scheduling metric for each DL-UL pair of the plurality of DL-UL pairs and a downlink scheduling metric for each DL-MD of the plurality of DL-MDs to obtain scheduling metrics;
select an DL-UL pair or a DL-MD having a pre-defined rank in the scheduling metrics; and
schedule a radio channel resource to the DL-MD and the UL-MD of the DL-UL pair or the DL-MD having the pre-defined rank in the scheduling metrics.

Example 67 includes the base station of example 41, wherein the scheduler is configured to identify a plurality of downlink-uplink (DL-UL) pairs by discarding DL-UL pairs that are not pair-able due to interference.

Example 68 includes the base station of example 67, wherein the scheduler is configured to process a bit-map fed back by each DL-MD of the plurality of DL-MDs indicating its pair-able UL-MDs.

Example 69 includes the base station of example 68, wherein the bit-map of each DL-MD indicates strong interfering UL-MDs, weak interfering UL-MDs and non-interfering DL-MDs.

Example 70 includes the base station of any of examples 65 to 69, wherein the pre-defined rank is a highest rank in the scheduling metrics.

Example 71 includes the base station of example 41, wherein the scheduler is configured to:
identify a plurality of mobile devices configured for uplink transmission (UL-MDs);
identify a plurality of mobile devices configured for downlink transmission (DL-MDs);
compute an uplink (UL) scheduling metric for each UL-MD of the plurality of UL-MDs to obtain (UL) scheduling metrics;
select an UL-MD having a pre-defined rank in the UL scheduling metrics;
identify a plurality of downlink-uplink (DL-UL) pairs by pairing the UL-MD having the pre-defined rank in the UL scheduling metrics with each DL-MD of the plurality of DL-MDs;
jointly optimize both uplink and downlink transmission of the base station by computing a joint scheduling metric for each DL-UL pair of the plurality of DL-UL pairs to obtain joint scheduling metrics; and
select an DL-UL pair having a pre-defined rank in the scheduling metrics; and schedule a radio channel resource to the DL-MD and the UL-MD of the DL-UL pair having the pre-defined rank in the scheduling metrics.

Example 72 includes the base station of example 71, wherein the pre-defined rank in the UL scheduling metrics is a highest rank in the UL scheduling metrics and wherein the pre-defined rank in the scheduling metrics is a highest rank in the scheduling metrics.

Example 73 includes the base station of example 41, wherein the scheduler is configured to:
identify a plurality of mobile devices configured for uplink transmission (UL-MDs);
identify a plurality of mobile devices configured for downlink transmission (DL-MDs);
compute a downlink (DL) scheduling metric for each DL-MD of the plurality of DL-MDs to obtain downlink scheduling metrics;
select a DL-MD having a pre-defined rank in the DL scheduling metrics;
identify a plurality of downlink-uplink (DL-UL) pairs by pairing the DL-MD having the pre-defined rank in the DL scheduling metrics with each UL-MD of the plurality of UL-MDs;
jointly optimize both uplink and downlink transmission of the base station by computing a joint scheduling metric for each DL-UL pair of the plurality of DL-UL pairs to obtain joint scheduling metrics; and
select an DL-UL pair having a pre-defined rank in the joint scheduling metrics; and schedule a radio channel resource to the DL-MD and the UL-MD of the DL-UL pair having the pre-defined rank in the scheduling metrics.

Example 74 includes the base station of example 73, wherein the pre-defined rank in the DL scheduling metric is a highest rank in the DL scheduling metrics and wherein the pre-defined in the scheduling metrics is a highest rank in the scheduling metrics.

Example 75 includes the base station of any of examples 71 to 74, wherein the joint scheduling metric is adjusted to reflect an impact of MD-to-MD interference on a DL-MD rate and to a potential UL-MD power adaption to mitigate MD-to-MD interference.

Example 76 includes the base station of any of examples 41 to 75, wherein the scheduler is configured to identify a plurality of downlink-uplink (DL-UL) pairs by identifying a full duplex mobile device configured for simultaneous downlink transmission and uplink transmission representing a DL-MD and an UL-MD.

Example 77 includes the base station of example 76, wherein at least some of the DL-UL pairs of the plurality of DL-UL pairs is a full duplex mobile device (FD-MD) configured for simultaneous downlink transmission and uplink transmission representing a DL-MD and an UL-MD of a DL-UL pair.

Example 78 includes the base station of example 77, wherein each FD-MD is configured to employ channel quality indicator (CQI) feedback disregarding intra-cell MD-to-MD interference.

Example 79 includes the base station of any of examples 41 to 74, wherein at least some of the DL-UL pairs of the plurality of DL-UL pairs are a full duplex mobile device (FD-MD) configured for either downlink transmission or uplink transmission and a half duplex mobile device (HD-MD) configured for the opposite transmission direction as the FD-MD.

Example 80 includes the base station of example 79, wherein the scheduler is configured to compute a joint scheduling metric for each DL-UL pair of the plurality of DL-UL pairs by estimating a downlink data rate based on rank indicator (RI) and precoding matrix indicator (PMI) information that is fed back by a mobile device (MD) to the base station (BS), wherein the RI is a wide-band rank indicator based on overall interference including intra-cell MD-MD interference, inter-cell MD-MD interference and inter-cell BS-MD interference and wherein the PMI is based on the wide-bank rank indicator and on sub-band serving channel information measured from serving cell reference signals.

It should be noted that one or more of the features of any of the examples above may be combined with any one of the other examples. It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:
1. A method for operating a base station (BS) in a full duplex (FD) cellular system, the method comprising:
identifying a plurality of downlink-uplink (DL-UL) pairs, wherein each DL-UL pair comprises a mobile device configured for downlink transmission (DL-MD) of a plurality of downlink mobile devices DL-MDs and a mobile device configured for uplink transmission (UL-MD) of a plurality of uplink mobile devices UL-MDs;
jointly optimizing both uplink transmission and downlink transmission of the base station by
computing a joint scheduling metric for each DL-UL pair of the plurality of DL-UL pairs to obtain scheduling metrics;
selecting an DL-UL pair based on a pre-defined rank in the scheduling metrics; and scheduling a radio channel resource to the DL-MD and the UL-MD of the DL-UL pair having the pre-defined rank in the scheduling metrics.

2. The method of claim 1, wherein the pre-defined rank in the scheduling metrics is a highest rank in the scheduling metrics.

3. The method of claim 1, wherein jointly optimizing both uplink and downlink transmission comprises employing a guarantee fairness scheduler.

4. The method of claim 1, wherein jointly optimizing both uplink and downlink transmission comprises employing an alpha-fair scheduler with fairness parameter α.

5. The method of claim 4, wherein jointly optimizing both uplink and downlink transmission comprises optimizing the following optimization target $\Sigma_u f_\alpha(w_{DL} \cdot TP_u^{(DL)} + w_{UL} \cdot TP_u^{(UL)})$ with respect to throughput, wherein $f_\alpha$ denotes an alpha-fair throughput of user u, wherein user u can be a DL-MD or an UL-MD, $w_{DL}$ denotes a downlink weight indicating a preciousness of downlink resources, $w_{UL}$ denotes an uplink weight indicating a preciousness of uplink resources, $TP_u^{(DL)}$ denotes a downlink throughput of user u and $TP_u^{(UL)}$ denotes an uplink throughput of user u.

6. The method of claim 5, wherein computing a joint scheduling metric for each UL-DL pair $(u_1,u_2)$ of DL-MD $u_1$ and UL-MD $u_2$ of the plurality of UL-DL pairs comprises computing:

$$\frac{w_{DL} \cdot R_{u_1,(UL-MD=u_2)}^{(DL)}(RB_i) + w_{UL} \cdot R_{u_2,(DL-MD=u_1)}^{(UL)}(RB_i)}{\left(w_{DL} \cdot RTP_{u_1}^{(DL)} + w_{UL} \cdot RTP_{u_2}^{(UL)}\right)^\alpha},$$

wherein $RB_i$ denotes an i-th resource block of a channel resource to be scheduled, $w_{DL}$ denotes a downlink weight indicating a preciousness of downlink resources, $w_{UL}$ denotes an uplink weight indicating a preciousness of uplink resources, $R_{u_1,(UL-MD=u_2)}^{(DL)}(RB_i)$ denotes a data rate estimation of DL-MD $u_1$ when pairing with UL-MD $u_2$ on $RB_i$, $R_{u_2,(DL-MD=u_1)}^{(UL)}(RB_i)$ denotes a data rate estimation of UL-MD when pairing with DL-MD $u_2$ on $RB_i$, $RTP_{u_1}^{(DL)}$ denotes a recent downlink throughput of DL-MD $u_1$, and $RTP_{u_2}^{(UL)}$ denotes a recent uplink throughput of UL-MD $u_2$.

7. The method of claim 4, wherein the alpha-fair scheduler optimizes the following optimization target:

$\Sigma_u f_\alpha(TP_u);$ wherein $TP_u$ denote the throughput of user u; and wherein an alpha-throughput is defined as:

$$(TP_u) = \begin{cases} (TP_u)^{1-\alpha}/(1-\alpha), & \text{for } \alpha \neq 1; \\ \log(TP_u), & \text{for } \alpha = 1 \end{cases}.$$

8. The method of claim 4, wherein α equals one.
9. The method of claim 4, wherein α equals zero.
10. The method of claim 4, wherein α equals infinity.
11. The method of claim 1, wherein jointly optimizing both uplink and downlink transmission comprises optimizing the following optimization target $\Sigma_u(w_{DL} \cdot f_\alpha(TP_u^{(DL)}) + w_{UL} \cdot (TP_u^{(UL)}))$ with respect to throughput, wherein $f_\alpha$ denotes an alpha-fair throughput of mobile device u, wherein the mobile device u is a DL-MD or an UL-MD, $w_{DL}$ denotes a downlink weight indicating a preciousness of downlink resources, $w_{UL}$ denotes an uplink weight indicating a preciousness of uplink resources, $TP_u^{(DL)}$ denotes a downlink throughput of user u and $TP_u^{(UL)}$ denotes an uplink throughput of user u.

12. The method of claim 11, wherein computing a joint scheduling metric for each UL-DL pair $(u_1,u_2)$ comprising DL-MD and UL-MD $u_2$ of the plurality of UL-DL pairs comprises computing:

$$\frac{w_{DL} \cdot R_{u_1,(UL-MD=u_2)}^{(DL)}(RB_i)}{\left(RTP_{u_1}^{(DL)}\right)^\alpha} + \frac{w_{UL} \cdot R_{u_2,(DL-MD=u_1)}^{(UL)}(RB_i)}{\left(RTP_{u_2}^{(UL)}\right)^\alpha},$$

wherein $RB_i$ denotes an i-th resource block of the radio channel resource to be scheduled, $w_{DL}$ denotes a downlink weight indicating a preciousness of downlink resources, $w_{UL}$ denotes an uplink weight indicating a preciousness of uplink resources, $R_{u_1,(UL-MD=u_2)}^{(DL)}(RB_i)$ denotes a data rate estimation of DL-MD $u_1$ when pairing with UL-MD $u_2$ on $RB_i$, $R_{u_2,(UL-MD=u_1)}^{(UL)}(RB_i)$ denotes a data rate estimation of UL-MD $u_2$ when pairing with DL-MD $u_2$ on $RB_i$, $RTP_{u_1}^{(DL)}$ denotes a recent downlink throughput of DL-MD $u_1$, and $RTP_{u_2}^{(UL)}$ denotes a recent uplink throughput of UL-MD $u_2$.

13. The method of claim 1, wherein computing a joint scheduling metric for each DL-UL pair of the plurality of DL-UL pairs comprises computing a linear combination of half-duplex scheduling metrics.

14. The method of claim 13 further comprising: adjusting the half-duplex scheduling metrics when pairing a MD with another MD in an opposite transmission direction.

15. The method of claim 13 further comprising: adjusting the half-duplex scheduling metrics when pairing an UL transmission with a DL transmission of a full duplex mobile device.

16. The method of claim 13, wherein computing a joint scheduling metric for each UL-DL pair $(u_1,u_2)$ of DL-MD $u_1$ and UL-MD $u_2$ of the plurality of UL-DL pairs comprises computing $w_{DL} SM_{u_1,(UL-MD=u_2)}^{(DL)}(RB_i) + w_{UL} \cdot SM_{u_2,(DL-MD=u_1)}^{(UL)}(RB_i)$, wherein $RB_i$ denotes an i-th resource block of a channel resource to be scheduled, $w_{DL}$ denotes a downlink weight indicating a preciousness of downlink resources, $w_{UL}$ denotes an uplink weight indicating a preciousness of uplink resources, $SM_{u_1,(UL-MD=u_2)}^{(DL)}(RB_i)$ denotes an half duplex downlink scheduling metric for DL-MD $u_1$ on $RB_i$ when pairing with UL-MD $u_2$ and $SM_{u_2,(UL-MD=u_1)}^{(UL)}(RB_i)$ denotes an half duplex uplink scheduling metric of UL-MD $u_2$ on RB when pairing with DL-MD $u_1$.

17. The method of claim 16, wherein computing a linear combination of half-duplex scheduling metrics comprises computing a downlink half duplex scheduling metric and an uplink half duplex scheduling metric separately with a data rate adjusted based on the MD paired on an opposite transmission direction.

18. The method of claim 13, wherein the half-duplex scheduling metrics comprise scheduling metrics for a channel-aware and queue-aware scheduler, wherein the scheduling metrics are dependent on data rate and queue size of a data queue.

19. The method of claim 1, wherein computing a joint scheduling metric for each DL-UL pair of the plurality of DL-UL pairs comprises computing a half-duplex downlink scheduling metric and a half-duplex uplink scheduling metric and wherein
    selecting an DL-UL pair having a pre-defined rank in the joint scheduling metrics comprises selecting a DL-MD having the pre-defined rank in the half-duplex downlink scheduling metric and selecting an UL-MD having the pre-defined rank in the half-duplex uplink scheduling metric, wherein the DL-UL pair comprises the selected DL-MD and the selected UL-MD.

20. A base station (BS) comprising:
a radio transceiver configured to provide a full-duplex air interface to mobile devices (MDs);
a scheduler interfaced to the radio transceiver, wherein the scheduler is configured to:
identify a plurality of downlink-uplink (DL-UL) pairs, wherein each DL-UL pair comprises a mobile device configured for downlink transmission (DL-MD) of a plurality of downlink mobile devices (DL-MDs and a mobile device configured for uplink transmission (UL-MD) of a plurality of uplink mobile devices (UL-MDs);
jointly optimize both uplink transmission and downlink transmission of the base station by
computing a joint scheduling metric for each DL-UL pair of the plurality of DL-UL pairs to obtain scheduling metrics;
select an DL-UL pair based on a pre-defined rank in the scheduling metrics; and
schedule a radio channel resource to the DL-MD and the UL-MD of the DL-UL pair having the pre-defined rank in the scheduling metrics.

\* \* \* \* \*

UNITED STATES PATENT AND TRADEMARK OFFICE
CERTIFICATE OF CORRECTION

PATENT NO. : 10,833,832 B2  
APPLICATION NO. : 16/303182  
DATED : November 10, 2020  
INVENTOR(S) : Shu-Ping Yeh et al.

Page 1 of 1

It is certified that error appears in the above-identified patent and that said Letters Patent is hereby corrected as shown below:

In the Claims

Column 32, Line 2: Please delete "$W_{UL} \cdot TP_u^{(UL)})$" between the words "+" and "with", and write "$W_{UL} \cdot f_a(TP_u^{(UL)}))$" in place thereof.

Column 32, Line 32: Please delete "$R_{u_1(UL-MD=u_1)}^{(UL)}(RB_i)$" between the words "$RB_i$" and "denotes", and write "$R_{u_1(DL-MD=u_1)}^{(UL)}(RB_i)$" in place thereof.

Column 32, Line 65: Please delete "$SM_{u_2(UL-MD=u_1)}^{(UL)}(RB_i)$" between the words "and" and "denotes", and write "$SM_{u_2(DL-MD=u_1)}^{(UL)}(RB_i)$" in place thereof.

Column 32, Line 66: Please delete "RB" between the words "on" and "when", and write "$RB_i$" in place thereof.

Signed and Sealed this  
Ninth Day of February, 2021

Drew Hirshfeld  
*Performing the Functions and Duties of the  
Under Secretary of Commerce for Intellectual Property and  
Director of the United States Patent and Trademark Office*